United States Patent
Bruflodt et al.

(10) Patent No.: US 11,590,892 B2
(45) Date of Patent: Feb. 28, 2023

(54) WORK VEHICLE DISPLAY SYSTEMS AND METHODS FOR GENERATING VISUALLY-MANIPULATED CONTEXT VIEWS

(71) Applicant: Deere & Company, Moline, IL (US)

(72) Inventors: Rachel Bruflodt, Dubuque, IA (US); Giovanni A. Wuisan, Epworth, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/366,899

(22) Filed: Jul. 2, 2021

(65) Prior Publication Data
US 2023/0001854 A1 Jan. 5, 2023

(51) Int. Cl.
*B60R 1/00* (2022.01)
*G05D 1/00* (2006.01)
*G05D 1/02* (2020.01)

(52) U.S. Cl.
CPC ............ *B60R 1/00* (2013.01); *G05D 1/0038* (2013.01); *G05D 1/0214* (2013.01);
(Continued)

(58) Field of Classification Search
None
See application file for complete search history.

(56) References Cited

U.S. PATENT DOCUMENTS

2009/0265061 A1* 10/2009 Watanabe .............. G08G 1/166
701/36

2011/0032357 A1* 2/2011 Kitaura ................. G06T 3/0056
348/148
(Continued)

FOREIGN PATENT DOCUMENTS

DE 102017117094 A1 1/2019

OTHER PUBLICATIONS

Ford Motor Company, YouTube—How to Use 360 Camera with Split-view Display—(https://www.youtube.com/watch?v=2asWY4qcJtl) Mar. 21, 2017.
(Continued)

*Primary Examiner* — Rebecca A Volentine
(74) *Attorney, Agent, or Firm* — Klintworth & Rozenblat IP LLP

(57) ABSTRACT

A work vehicle display system utilized in piloting a work vehicle includes a display device having a display screen, a context camera mounted to the work vehicle and positioned to capture a context camera feed of the work vehicle's exterior environment, and a controller architecture. The controller architecture is configured to: (i) receive the context camera feed from the context camera; (ii) generate a visually-manipulated context view utilizing the context camera feed; and (iii) output the visually-manipulated context view to the display device for presentation on the display screen. In the process of generating the visually-manipulated context view, the controller architecture applies a dynamic distortion-perspective (D/P) modification effect to the context camera feed, while gradually adjusting a parameter of the dynamic D/P modification effect in response to changes in operator viewing preferences or in response to changes in a current operating condition of the work vehicle.

20 Claims, 10 Drawing Sheets

(52) U.S. Cl.
CPC ... *B60R 2300/207* (2013.01); *B60R 2300/302* (2013.01); *B60R 2300/306* (2013.01); *B60R 2300/307* (2013.01); *B60R 2300/8086* (2013.01); *B60R 2300/8093* (2013.01); *G05D 2201/0201* (2013.01)

(56) References Cited

U.S. PATENT DOCUMENTS

| | | | | |
|---|---|---|---|---|
| 2012/0090909 | A1* | 4/2012 | Menzenbach | B62D 7/1509 348/148 |
| 2014/0375814 | A1 | 12/2014 | Ishimoto et al. | |
| 2017/0120820 | A1* | 5/2017 | Petzold | E02F 9/24 |
| 2018/0276792 | A1* | 9/2018 | Stepanenko | G06T 5/006 |
| 2019/0381935 | A1* | 12/2019 | Konstantin | B60R 1/00 |
| 2020/0219398 | A1* | 7/2020 | Shimizu | G06T 3/4038 |
| 2021/0303834 | A1* | 9/2021 | Ozaki | G06T 5/006 |

OTHER PUBLICATIONS

Chevrolet, YouTube—2020 Silverado HD Invisible Trailer Mode and its 15 Cameras (https://www.youtube.com/watch?v=xox-Ym9ZW8k, Oct. 30, 2019.

BMW, YouTube—How to Use the Different Camera Views of Surround View (https://www.youtube.com/watch?v=RziW6FPfLGQ, Apr. 17, 2019.

Ford Motor Company, YouTube—How to Use F-150 Backup Camera— (https://www.youtube.com/watch?v=xtMCvXxH150) Jul. 17, 2017.

Honda, YouTube—Multi-Angle Rearview Camera—(https://www.youtube.com/watch?v=Mx08k0a1nWg) Sep. 15, 2020.

German Search Report issued in application No. DE102022205238.2 dated Nov. 23, 2022 (10 pages).

\* cited by examiner

WORK VEHICLE DISPLAY SYSTEMS AND METHODS FOR GENERATING VISUALLY-MANIPULATED CONTEXT VIEWS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle display systems and methods for generating visually-manipulated context views of a work vehicle's surrounding environment.

BACKGROUND OF THE DISCLOSURE

Work vehicles utilized within construction, agriculture, forestry, mining, and other industries commonly operate in challenging work environments. Operators are often required to carefully navigate such work vehicles, while performing various tasks and avoiding surrounding structures, neighboring work vehicles, and other obstacles. A given work vehicle may be a sizable and complex machine, requiring a relatively high level of operator skill to control the various functions of the work vehicle, in many instances including the movement of boom-mounted implements or other end effectors. Concurrently, visibility from the operator station or cabin of the work vehicle may be limited by the chassis of the work vehicle, by the positioning of a bucket or other end effector relative to the cabin, and other visual hinderances. For this reason, certain work vehicles are now equipped with camera-based display systems providing operators with relatively unobstructed contextual views of a work vehicle's exterior environment. As a specific example, a work vehicle may be equipped with a camera-based display system providing an operator with a view (live camera feed) of the environment generally to the rear of the work vehicle, as presented on a display screen within the cabin of the work vehicle. This not only improves operator efficiency and situational or contextual awareness by providing an unobstructed rear view of the work vehicle's surrounding environment, but may also improve operator comfort by enabling the operator to remain seated in a forwarding-facing position, while viewing the display screen and operating the work vehicle in reverse.

SUMMARY OF THE DISCLOSURE

Embodiments of a work vehicle display system, which generates a visually-manipulated context view for presentation on a display device, are disclosed. In embodiments, the work vehicle display system includes a display device having a display screen, a context camera mounted to the work vehicle and positioned to capture a context camera feed of the work vehicle's exterior environment, and a controller architecture coupled to the display device and the context camera. The controller architecture is configured to: (i) receive the context camera feed from the context camera; (ii) generate a visually-manipulated context view utilizing the context camera feed; and (iii) output the visually-manipulated context view to the display device for presentation on the display screen. In the process of generating the visually-manipulated context view, the controller architecture applies a dynamic distortion-perspective (D/P) modification effect to the context camera feed, while gradually adjusting a parameter of the dynamic D/P modification effect in response to changes in operator viewing preferences or in response to changes in a current operating condition of the work vehicle.

Embodiments of a method, which is carried-out by a controller architecture of a work vehicle display system, are further disclosed. In addition to the controller architecture, the work vehicle display system includes a context camera mounted to a work vehicle and a display device having a display screen, with the context camera and the display device each operably coupled to the controller architecture. In implementations, the method includes the steps or processes of: (i) receiving, at the controller architecture, a context camera feed from the context camera; (ii) generating, at the controller architecture, a visually-manipulated context view utilizing the context camera feed; and (iii) outputting the visually-manipulated context view to the display device for presentation on the display screen. The step of generating includes, in turn, the sub-steps or sub-processes of: (ii)(a) applying a dynamic D/P modification effect to the context camera feed; and (ii)(b) while applying the dynamic D/P modification effect to the context camera feed, gradually adjusting a parameter of the dynamic D/P modification effect in response to changes in operator viewing preferences or in response to changes in a current operating condition of the work vehicle.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
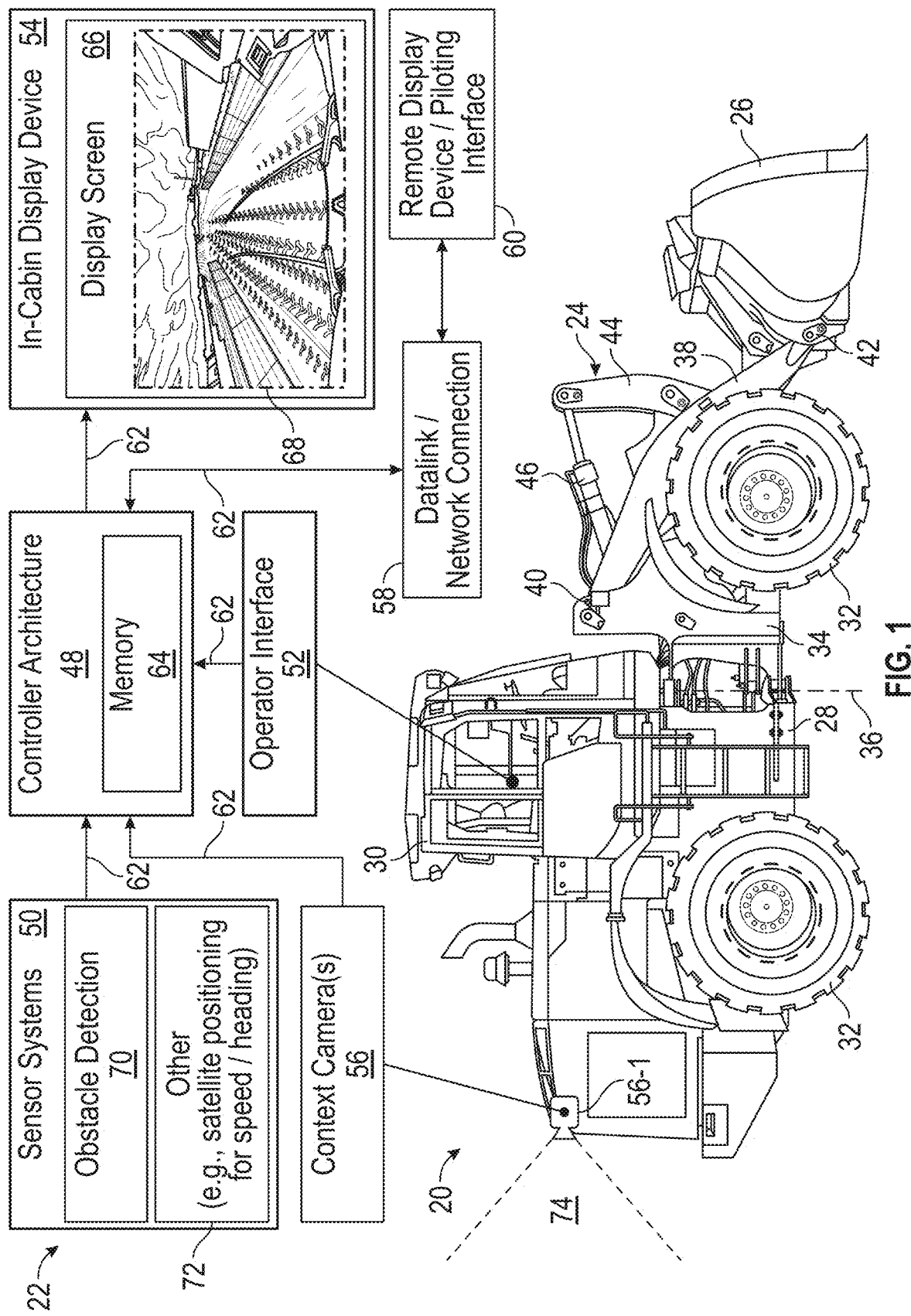
FIG. 1 is a side view of a work vehicle (here, a wheel loader) equipped with a work vehicle display system including a controller architecture configured to generate a visually-manipulated context view utilizing at least one live video feed received from one or more context cameras mounted to the work vehicle, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing herein, the term "exterior environment" and the term "surrounding environment" are utilized interchangeably to refer to a work environment or spatial region exterior to a work vehicle, whether generally located to the front, to a side, or to the rear of the work vehicle, or any combination thereof. Further, the term "display" refers the imagery or "picture" generated on the screen of a display device, while the term "display device" refers to an image-generating device on which a display is presented. The term "view" is also utilized in reference to imagery derived from a camera feed, which is captured by a vehicle-mounted context camera and generated on a display device for viewing by a work vehicle operator, to present the operator with imagery seen from the viewpoint of the context camera.

Overview

As previously mentioned, work vehicles are commonly equipped with display systems including one or more vehicle-mounted cameras positioned to capture imagery of the work vehicle's surrounding environment. Such cameras are referred to herein as "context cameras," while the imagery or video feeds captured by the context cameras are referred to as "context camera feeds," given that such vehicle-mounted cameras enable a given work vehicle operator to establish an improved situational or contextual awareness of the work vehicle's surrounding environment. By viewing imagery captured by one or more context cameras, a work vehicle operator can quickly maintain an increasingly comprehensive and timely mental model of a work vehicle's surrounding environment. This is of significant importance in the context of work vehicles employed in construction, agriculture, mining, and forestry industries given the relatively large size of many work vehicles, and the complexities involved in piloting work vehicles, and the dynamic environments within which many work vehicles operate. For example, in the case of loaders, excavators, dozers, motor graders, dump trucks, and other work vehicles utilized within the construction industry, it is common for several work vehicles to operate within a shared work space populated with various obstacles, both moving and stationary, and often possessing uneven topologies and other visual hinderances. Consequently, in such situations, work vehicle operators may be required to maintain an acute awareness of the 360 degree spatial region surrounding a given work vehicle, while efficiently performing any number of work tasks assigned to the work vehicle operator.

Existing work vehicle display systems beneficially aid an operator in maintaining an enhanced situational awareness of obstacles and objects within the work vehicle's surrounding environment by presenting live camera feeds or "context views," which are captured by vehicle-mounted context cameras, on an in-cabin display device readily viewable by an operator piloting the work vehicle. Additionally, through the incorporation of context cameras having wide-angle or ultrawide-angle lenses, or perhaps through the usage of multiple context cameras having partially-overlapping fields of view (FOVs), relatively expansive, panoramic context camera views can be presented to the work vehicle operator, which may permit the operator to quickly scan and monitor a greater portion of the environment exterior to the work vehicle. For example, in this regard, certain work vehicles may be equipped with an ultrawide-angle backup camera having an angle of view approaching or exceeding 180 degrees. The imagery captured by such an ultrawide-angle backup camera can be presented on a display screen located within the work vehicle to provide a relatively expansive view of the environment located immediately behind the work vehicle, while further capturing spatial regions located to either side of the work vehicle to increase operator awareness of peripheral obstacles, including potential cross-traffic events.

While beneficial for the reasons just described, conventional approaches for furnishing an operator with a panoramic context camera feed captured utilizing a wide-angle or ultrawide-angle context camera, such as a 180 degree backup camera, are associated with certain tradeoffs. Due to the convexity of the camera lens, wide angle cameras often impart significant visual distortion or warping to the captured panoramic (hemispherical) imagery. By conventional practice, such hemispherical distortion is entirely corrected utilizing distortion correction algorithms to yield a fully undistorted image or context camera view, which is then presented for operator viewing. Beneficially, such a fully undistorted image matches a typical camera view and is thus readily comprehended by work vehicle operators. However, the fully undistorted image also inherently omits a certain amount of the peripheral imagery captured by a given context camera, which may be undesirable in at least some work vehicle operating scenarios. For this reason, certain existing display systems enable an operator to deactivate the above-described distortion correction function and view the fully distorted imagery captured by a wide-angle or ultrawide-angle camera. Such a fully distorted view, however, is visually confusing to many operators and can obscure operationally-significant objects located in the periphery of the camera FOV. More generally, panoramic context views, whether generated by correcting a distorted image captured by a wide-angle context camera or produced by compiling camera feeds from multiple context cameras having partially overlapping FOVs, can deemphasize or visually obscure operationally-significant objects due to the breadth of the panoramic view when scaled to fit the in-cabin display screen in at least some instances.

There thus exists an ongoing demand for work vehicle display systems capable of generating context camera feeds in situationally-intelligent and operator-customizable manners. In satisfaction of this demand, the following discloses work vehicle display systems, which generate so-called "visually manipulated context views" through the application of dynamic visual effects to imagery captured by one or more vehicle-mounted context cameras. Such visually-manipulated context views are generated utilizing at least one context camera feed, which is captured by one or more context camera mounted to a work vehicle. A controller architecture (e.g., one or more interconnected processors) included in the display system generates the visually-manipulated context view by applying a dynamic distortion-perspective (D/P) modification effect to the context camera feed from which the visually-manipulated context view is derived. While applying such a dynamic D/P effect, the controller architecture gradually or incrementally adjusts at least one parameter of the dynamic D/P modification effect in response to changes in operator viewing preferences or in response to changes in a current operating condition of the work vehicle. The controller architecture then outputs the visually-manipulated context view to a suitable display device for operator viewing. The display device will commonly be located within the cabin of the work vehicle, but may also be located offboard the work vehicle in certain instances, such as when the work vehicle is remotely piloted.

As appearing throughout this document, the term "dynamic distortion-perspective modification effect" or "dynamic D/P modification effect" refers to a visual effect involving distortion (warping) effects and/or perspective adjustment effects (e.g., simulated horizontal or vertical focal length variations), which vary over time in a gradual, non-abrupt manner in conjunction with operator input specifying operator viewing preferences or in conjunction with monitored operating conditions of a work vehicle. In embodiments, the controller architecture of the work vehicle display system may apply the dynamic D/P modification effect, at in part, by manipulating imagery within a particular context camera feed utilizing a barrel distortion effect to yield a partially-distorted image derived from the context camera feed, with the intensity of the applied distortion gradually increasing or decreasing in conjunction with pertinent data inputs. In addition to or in lieu of such barrel distortion effects, the dynamic D/P modification may also entail simulated focal length adjustments (essentially, varying degrees of vertical and/or horizontal stretching of imagery within the context camera feed), which are applied by the work vehicle display system in generating the visually-manipulated context view. For example, in one approach, the controller architecture of the display system may repeatedly establish the location and dimensions of a crop window bounding an area-of-interest within the context camera feed. The controller architecture then resizes the imagery within the area-of-interest bounded by the crop window to fit the display screen. This process is repeated while adjusting one or more aspects of the crop window (e.g., the crop window length, height, aspect ratio, and/or location) in response to the relevant data input or inputs to yield the visually-manipulated context view. Various other D/P modification effects can also be applied by the controller architecture of the work vehicle display in generating the visually-manipulated context view, as further discussed below.

As indicated by the term "dynamic," the dynamic D/P modification effect is applied in a reactive manner during which the controller architecture gradually adjusts at least one parameter of the dynamic D/P modification effect in response to changes in operator viewing preferences or to changes in a current operating condition of the work vehicle. As a specific example, in embodiments in which a barrel distortion effect is applied to the context camera feed to generate the visually-manipulated context view, the controller architecture may gradually adjust an intensity of the barrel distortion effect over a particular value range in a gradual, incremental, or visually non-abrupt manner. Such gradual adjustments can be performed as an operator interacts with a graphic user interface (GUI) or physical controls onboard the work vehicle to set the intensity of the barrel distortion effect to preference. Additionally or alternatively, such gradual adjustments in the intensity of the barrel distortion effect may occur in response to a monitored condition of the work vehicle, such as a ground speed of the work vehicle or the proximity of the work vehicle to an obstacle detected by an obstacle detection system onboard the work vehicle. So too may the controller architecture repeatedly adjust the center location of the barrel effect in embodiments (or otherwise adjust the perspective and distortion effects applied when generating the visually-manipulated context view) as appropriate to, for example, generally track a region or item of interest within the context camera feed, such as obstacles detected by the obstacle detection system and posing a potential collision risk to the work vehicle.

In at least some implementations of the work vehicle display system, and as briefly indicated above, the controller architecture may generate the visually-manipulated context view by initially establishing a crop window bounding an area-of-interest within the context camera feed. The controller architecture may then resize imagery within the area-of-interest to fit the display screen, while excluding imagery outside of the crop window to yield the visually-manipulated context view. In this case, the controller architecture may further gradually adjust at least one D/P modification parameter (whether in response to operator input or in response in changes to a monitored operating condition of the work vehicle) by incrementally modifying at least one dimension of the crop window, an aspect ratio of the crop window, or a location of the crop window within the context camera feed. Adjustments to the aspect ratio of the crop window may effectively simulate modifications to a horizontal focal length, a vertical focal length, or another perspective parameter of the visually-manipulated context view relative to the context camera feed; noting that, while the crop window will often possess a generally rectangular geometry, length adjustments to the individual sides of the crop window are possible in embodiments to impart the crop window with a trapezoidal shape or other shape in embodiments.

Continuing the description above, aspects of the crop window can be adjusted in response to operator input and/or changes in a monitored operating condition of the work vehicle. For example, in certain embodiments, the controller architecture may monitor a ground speed of the work vehicle utilizing a positioning system, such as a Global Positioning System (GPS) module or other satellite-based positioning system onboard the work vehicle. The controller architecture may then widen the crop window as the ground speed of the work vehicle increases to impart the operator with an enhanced view of the work vehicle's exterior environment at higher vehicle speeds, particularly the spatial regions of the exterior environment toward which the work vehicle is generally traveling. Again, such changes are applied in a gradual manner such that, as the work vehicle ground speed increases, the crop window gradually widens in a visually non-abrupt manner; noting that, in embodiments, such a function may be selectively activated and deactivated by an operator, or an operator may be permitted to control the rate at which the crop window (and the resulting visually-manipulated context view) varies in width in such circumstances. Further, in such embodiments, the controller architecture may increase height of the crop window at a rate matching the rate of width increase to generally preserve the aspect ratio of the crop window, the controller architecture may increase height of the crop window at a rate different than (e.g., less than) the rate of width increase, or the controller architecture may not alter the height of the crop window, thereby effectively creating a horizontal distortion or stretch effect in conjunction with increasing vehicle ground speed. For example, in embodiments, such effects can be applied to create the impression, as perceived by an operator viewing the visually-manipulated context view, that objects appear increasingly closer to the work vehicle as the ground speed of the work vehicle increases.

Aspects of the crop window can be adjusted in relation to other operating conditions of the work vehicle in addition to or in lieu of changes in the work vehicle ground speed. For example, in certain embodiments, the controller architecture may monitor a trajectory of the work vehicle or, perhaps, the trajectory of an implement attached to the work vehicle, such as a bucket or other end effector mounted to a loader through a front end loader assembly or to an excavator through a boom assembly. The controller architecture may then adjust one or more aspects of the crop window in response to changes in the monitored trajectory of the work vehicle or the work vehicle implement. In this regard, the controller architecture may be configured to adjust the one or more aspects of the crop window such that visually-manipulated context view captures a greater portion of a spatial region toward which the work vehicle or the work vehicle implement is presently traveling. Consider, for example, a scenario in which the work vehicle is turning toward a specific spatial region of the geographical region surrounding the work vehicle. Here, the controller architecture may gradually move the crop window within the context camera feed to repeatedly center the crop window on the spatial region toward which the work vehicle is presently headed and/or the controller architecture may gradually widen the crop window to provide an enhanced view of this spatial region. Somewhat similarly, in embodiments in which the work vehicle is equipped with an obstacle detection system, the controller architecture may adjust one or more aspects of the crop window to visually emphasize obstacles detected by the obstacle detection system and posing a potential collision risk to the work vehicle; e.g., in effect, creating the visual impression, as perceived by an operator viewing the visually-manipulated context view, that a detected obstacle appears closer to work vehicle than the obstacle is in actuality when, for example, the detected obstacle poses a collision risk to the work vehicle. As a still more specific example in this regard, the controller architecture may monitor for cross-traffic collision risks utilizing the obstacle detection system; and when detecting a cross-traffic collision risk, adjust the at least one parameter of the dynamic D/P modification effect to reveal a greater portion of a spatial region in which the cross-traffic collision risk is located.

In embodiments of the work vehicle display system, the controller architecture of the work vehicle display system may also to generate the visually-manipulated context view to include perspective-drawn overlay images or graphics, while applying a commensurate dynamic D/P modification effect to the perspective-drawn overlay images. Such perspective-drawn overlay images may be, for example, projected path graphics representing a projected (forecast) path of the work vehicle or, perhaps, visually denoting the project path of an implement attached to the work vehicle. Regardless of whether the visually-manipulated context view is or is not generated as a composite image including such perspective-drawn overlay images, embodiments of the work vehicle display system intelligently provide dynamic, visually non-abrupt D/P adjustments to the visually-manipulated context view in response to variations in monitored operating conditions of the work vehicle and/or in response to tailored adjustments in operator viewing preferences. In so doing, embodiments of the work vehicle display system provide a higher level of customizability to better suit operator preferences and different operational scenarios, while further enhancing operator situational awareness to improve safety and work vehicle efficiency in an intuitive, visually seamless manner.

An example embodiment of the work vehicle display system will now be discussed in connection with FIGS. 1-10. For the purposes of explanation, the following example focuses on a particular type of work vehicle (a wheel loader) equipped with three vehicle-mounted context camera in the form of backup camera and two side view cameras. The following notwithstanding, it is emphasized that embodiments of the work vehicle display system can be utilized in conjunction with a wide range of work vehicles without limitation, that a given work vehicle can be equipped with any number of context cameras; and that the context camera(s) can capture views of any portions or regions of the environment surrounding or adjacent a given work vehicle.

Example Work Vehicle Display System for Generating Visually-Manipulated Context Views Referring initially to FIG. 1, a work vehicle (here, a wheel loader 20) is equipped with a work vehicle display system 22, which generates a unique visual display (herein, a "visually-manipulated context view") for operator reference in piloting the loader 20, in accordance with an example embodiment of the present disclosure. For completeness, certain structural features of the example wheel loader 20 are briefly described below to establish a non-limiting example context in which embodiments of work vehicle display system 22 may be better understood. This notwithstanding, it is emphasized that alternative embodiments of the work vehicle display system 22 can be beneficially integrated into various other types of construction work vehicles, including different tracked and wheeled loader, excavators, motor graders, and dump trucks, to list but a few examples. So too may alternative embodiments of the work vehicle display system 22 be integrated into work vehicles utilized in other industries, such as the agricultural, forestry, and mining industries.

In addition to the work vehicle display system 22, the example wheel loader 20 includes a front end loader (FEL) assembly 24 terminating in a tool or implement, here a bucket 26. The FEL assembly 24 is mounted to a main body or chassis 28 of the wheel loader 20, which is supported by front and rear ground-engaging wheels 32. A cabin 30 is located above a forward portion of the main chassis 28 and encloses an operator station containing a seat, operator controls (including the below-described operator interface 52), and other devices utilized in piloting the wheel loader 20. As further indicated in FIG. 1, the wheel loader 20 is imparted with articulated body such that a front portion or a forward loader frame 34 of the wheel loader 20 can rotate or pivot relative to the main chassis 28 about an upright axis 36 in accordance with commands received via the operator controls contained within the cabin 30. In other instances, the wheel loader 20 may lack an articulating body or may differ relative to the illustrated example in varying respects.

Briefly describing the FEL assembly 24, twin booms or lift arms 38 extend from the forward loader frame 34 in a forward direction to the backside of the FEL bucket 26. At one end, each lift arm 38 is joined to the forward loader frame 34 of the wheel loader via a first pin or pivot joint 40. At a second, longitudinally-opposed end, each lift arm 38 is joined to the FEL bucket 26 via a second pin or pivot joint 42. Two lift arm cylinders (hidden from view) are further mounted between the forward loader frame 34 of the wheel loader 20 and the lift arms 38. Extension of the lift arm cylinders results in rotation of the lift arms 38 about the pivot joints 40 and upward motion of the FEL bucket 26. The wheel loader 20 also includes a bucket cylinder 46, which is mechanically coupled between the forward loader frame 34 and a linkage 44. A central portion of the linkage 44 is, in turn, rotatably or pivotally mounted between the lift arms 38, while an end portion of the linkage is pivotally joined to the FEL bucket 26 opposite the bucket cylinder 46. Movement of the FEL assembly 24 may be controlled utilizing the operator interface 52 located within the cabin 30 of the wheel loader 20, with the operator interface 52 also potentially utilized to adjust certain aspects of the below-described visually-manipulated context view to operator preference or to otherwise interact with the work vehicle display system 22.

Describing now the example work vehicle display system 22 in greater detail, and as schematically depicted in an upper portion of FIG. 1, the work vehicle display system 22 includes a controller architecture 48, various onboard sensors 50, the above-mentioned operator interface 52, and at least one in-cabin display device 54. The work vehicle display system 22 further includes one or more video cameras 56 (herein, "vehicle-mounted context cameras 56"), which are mounted to the wheel loader 20 and positioned to capture different regions of the spatial environment exterior of the wheel loader 20. In certain embodiments, the work vehicle display system 22 may also include a wireless transceiver or datalink for providing a network connection (hereafter, network connection 58) to, for example, allow viewing of the visually-manipulated context views on a remote display device 60 and, perhaps, to further enable remote piloting of the wheel loader 20. The data connections between the controller architecture 48 and the various components or subsystems 50, 52, 54, 56, 58 of the work vehicle display system 22 are denoted by signal communication lines 62. The illustrated schematic, the signal communication lines 62 may represent wireless connections, wired connections, or any combination thereof. The terms "operably connected" and "operably coupled" are also utilized herein to refer to two components or systems placed in signal communication, whether directly or indirectly and over a wired connection, a wireless connection, or a combination thereof. The components included in the example work vehicle display system 22 are each described, in turn, below.

Initially addressing controller architecture 48, the term "controller architecture," as appearing throughout this document, is utilized in a broad sense to generally refer to the processing components of the work vehicle display system 22. The controller architecture 48 of the display system 22 can therefore assume any form suitable for performing the processing functions described herein. Accordingly, the controller architecture 48 can encompass or may be associated with any practical number of processors (central and graphical processing units), individual controllers (e.g., associate with the below-described context cameras 56), onboard control computers, navigational equipment pieces, computer-readable memories, power supplies, storage devices, interface cards, and other standardized components. Further, the controller architecture 48 may include or cooperate with any number of firmware and software programs or computer-readable instructions designed to carry-out any pertinent process tasks, calculations, algorithms, and control/display functions. The computer-readable instructions executed by the controller architecture 48 may be stored within a non-volatile sector of a computer-readable memory 64 further included in the work vehicle display system 22.

While generically illustrated in FIG. 1 as a single block, the memory 64 of the work vehicle display system 22 can encompass any number and type of storage media suitable for storing computer-readable code or instructions, as well as other data utilized to support the operation of the display system 22. For example, the memory 64 may store operator customization settings associated with unique operator identifications or pins and specifying operator preferences in generating the below-described visually-manipulated context views. Additionally or alternatively, the memory 64 may store data indicating baseline or default values of visual parameters (e.g., perspective and distortion modifications), which are utilized to generate the visually-manipulated context views and adjusted, as appropriate, in response to operator input data or relevant sensor data provided by the board sensors 50, as described below in connection with FIGS. 3-10.

The operator interface 52 of the work vehicle display system 22 can be any device or group of devices utilized by an operator of the wheel loader 20 to input data into or otherwise control the display system 22 and, more generally, the wheel loader 20. In various implementations, the operator interface 52, or portions of the operator interface 52, may be integrated into or otherwise associated with the below-described display device 54. For example, in this regard, the operator interface 52 may include physical inputs (e.g. buttons, switches, dials, or the like) located on or proximate the display device 54, a touchscreen module integrated into the display device 54, or a cursor input device (e.g., a joystick, trackball, or mouse) for positioning a cursor utilized to interface with graphic user interface (GUI) elements generated on the display device 54, as further discussed below. It should be understood that the operator interface 52, then, may include any number and type of operator input devices for receiving operator input commands including devices for interacting with GUIs, for receiving verbal input or voice commands, and/or for recognizing operator gesture commands.

The work vehicle display system 22 further includes at least one display device 54, which is located within the cabin 30 of the wheel loader 20 and positioned for convenient viewing by an operator seated within the loader cabin 30. Generally, the display device 54 can be any image-generating device having a display screen 66 on which a visually-manipulated context view is suitably generated for viewing by an operator piloting wheel loader 20. An example of a visually-manipulated context view 68 generated on the display screen 66 of the in-cabin display device 54 is shown in FIG. 1. In embodiments, the display device 54 may be affixed to the static structure of the operator cabin 30 and realized in a head-down display (HDD) configuration. In other instances, the display device 54 can assume the form of a portable electronic display device, such as a tablet computer or laptop, which is carried into the cabin 30 of the wheel loader 20 by a work vehicle operator and which communicates with the various other components of the work vehicle display system 22 over a physical connection or wireless connection to perform the below-described display functionalities. Additionally, and as previously noted, the visually-manipulated context view 68 (or an analogous view) can be generated on the remote display device 60 in embodiments for remote viewing when, for example, the wheel loader 20 is remotely piloted by a human operator.

The work vehicle display system 22 still further includes various onboard sensors 50 utilized to monitor operating conditions of the wheel loader 20, with such sensor data supplied to the controller architecture 48 and potentially utilized by the controller architecture 48 in generating the below-described visually-manipulated context views. In embodiments, certain onboard sensors 50 may be contained in an obstacle detection system 70 deployed onboard or integrated into the wheel loader 20. Such an obstacle detection system 70 may detect obstacles in proximity of the wheel loader 20 utilizing, for example, lidar, radar, or ultrasonic sensors arrays. Further, in certain embodiments, the obstacle detection system 70 may also detect obstacles within the vicinity of the wheel loader 20 through visual analysis or image processing of live camera feeds supplied by one or more cameras positioned about the wheel loader 20 in embodiments. This obstacle detection data, as collected by the obstacle detection system 70, may then be placed on a vehicle bus, such as a controller architecture area network (CAN) bus, or may otherwise be provided to the controller architecture 48 for consideration in embodiments in which the visually-manipulated context view is adjusted in response to aspects of detected obstacles, such as the proximity of detected obstacles to the wheel loader 20 or an assessed risk of collision with the wheel loader 20, as further described below.

Various other sensors 50 can also be included in the work vehicle display system 22 and supply real-time data pertaining to operational aspects or conditions of the wheel loader 20, which is then utilized by the controller architecture 48 in generating the visually-manipulated context view. For example, in certain implementations, the work vehicle display system 22 may include any number of sensors 72 for tracking the speed, trajectory, and positioning of the wheel loader 20 within a geographical context; and, perhaps, for tracking positioning and movement of the bucket 26 (or another implement) attached to the wheel loader 20 via the FEL assembly 24. In this regard, the wheel loader 20 may be equipped with a GPS module or other satellite-based positioning device for monitoring the position and movement of the wheel loader 20, which can be utilized to determine wheel loader ground speed, trajectory, heading, and other motion characteristics. Any number of gyroscopic sensors, accelerometers, and other such Microelectromechanical (MEMS) devices, perhaps packaged as inertial measurement units (IMUs), as well as can also be integrated into the wheel loader 20 to monitor the movement of wheel loader 20 or specifically the movement of the FEL assembly 24 and bucket 26 (generically, "implement movement"). Implement movement can also be tracked by integrating rotary position sensors into the pivot joints of the FEL assembly 24 and/or by monitoring hydraulic cylinder stroke utilizing linear transducers, and then converting the displacement to track the posture and position of the FEL assembly 24 (including the bucket 26) in three dimensional space.

Figure 2:
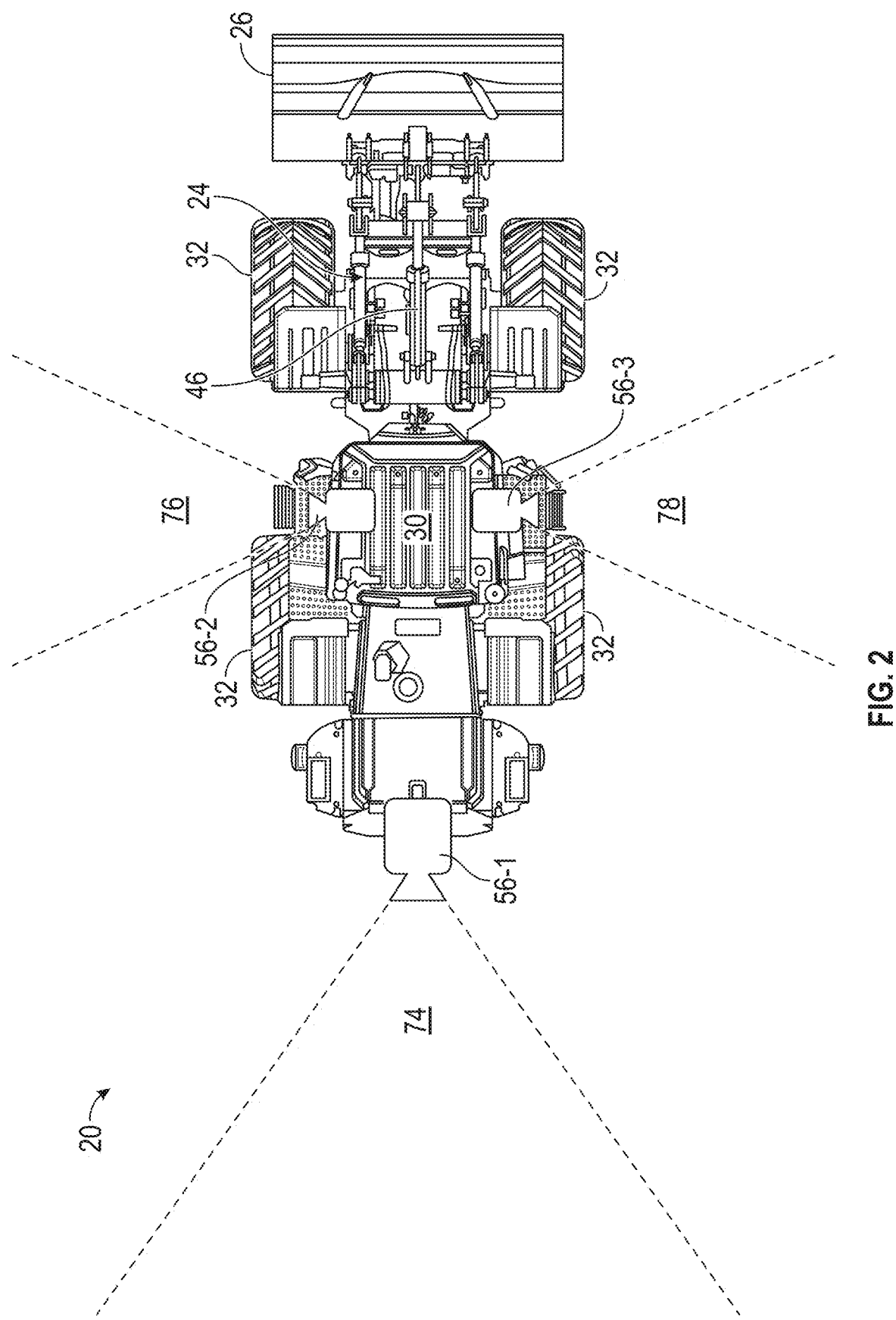
FIG. 2 is a top-down view of the wheel loader shown in FIG. 1 illustrating one manner in which a number of context cameras may be distributed about the wheel loader to capture the loader's operating environment from different viewing angles.

One or more context cameras 56 are mounted to the wheel loader 20 and positioned to capture live video feeds (herein, "context camera feeds") of the environment exterior to the loader 20. In the illustrated example, specifically, and referring now to FIG. 2 in conjunction with FIG. 1, the wheel loader 20 may be equipped with three such context cameras 56, which are identified individually as "60-1," "60-2," and "60-3." As shown in FIGS. 1 and 2, the context camera 56-1 may be rear-facing backup camera positioned to provide a FOV 74 capturing a spatial region to the rear of the wheel loader 20. In embodiments, the context camera 56-1 assumes the form of a wide-angle or ultrawide-angle backup camera having an angle of view approaching or exceeding 180 degrees. Several examples of distorted context camera feeds and visually-manipulated context views, which are suitably generated utilizing the distorted context camera feed (essentially, the source imagery captured by the context camera 56-1 when assuming the form of a wide-angle or ultrawide-angel backup camera), are discussed below. This notwithstanding, the following teachings are equally to additional context cameras mounted to the wheel loader 20 and positioned to capture other regions external to the loader 20 (or another work vehicle). In this regard, and as indicated in FIG. 2, side-view context cameras 56-2, 56-3 can be further mounted to the wheel loader 20 in at least some embodiments and positioned to captured FOVs 76, 78 located to the left and right of the wheel loader 20, respectively; the terms "left" and "right," as appearing in this context, defined relative to the orientation of an operator when seated within the cabin 30 and facing in a forward direction. The provision of the side-view context cameras 56-2, 56-3 may be particularly useful when, for example, it is desirable to monitor cross-traffic conditions within the work environment in which the wheel loader 20 operates.

In alternative implementations, the work vehicle display system 22 can include a greater or lesser number of context cameras, which can be positioned at various mount locations about the wheel loader 20 and oriented to capture any region exterior to the loader 20. For example, in certain cases, a forward-facing context camera may be mounted to the FEL assembly 24, to the bucket 26, or to the roof of the cabin 30 to provide a forward-facing view unobstructed (or less obstructed) by the bucket 26 when raised to a height at which the bucket 26 partially blocks the operator's view from the loader cabin 30. When the work vehicle display system 22 contains multiple context cameras, an operator may be permitted to switch between the live camera feeds or context views captured by the cameras by, for example, interacting with GUI elements generated on the display device 54 or otherwise interacting with the display system 22 utilizing the operator interface 52. Additionally or alternatively, the controller architecture 48 may automatically switch between different cameras views based upon a monitored operating condition of the wheel loader 20 in at least some instances. For example, in certain cases, the controller architecture 48 may automatically (that is, without requiring additional operator input) generate a visually-manipulated context view from the camera feed provided by the context camera 56-1 (if not presently generated) when the wheel loader 20 is placed in reverse. Similarly, the controller architecture 48 may automatically switch between different camera views in embodiments to, for example, better show obstacles detected by the obstacle detection system 70 within close proximity of the wheel loader 20.

Figure 3:
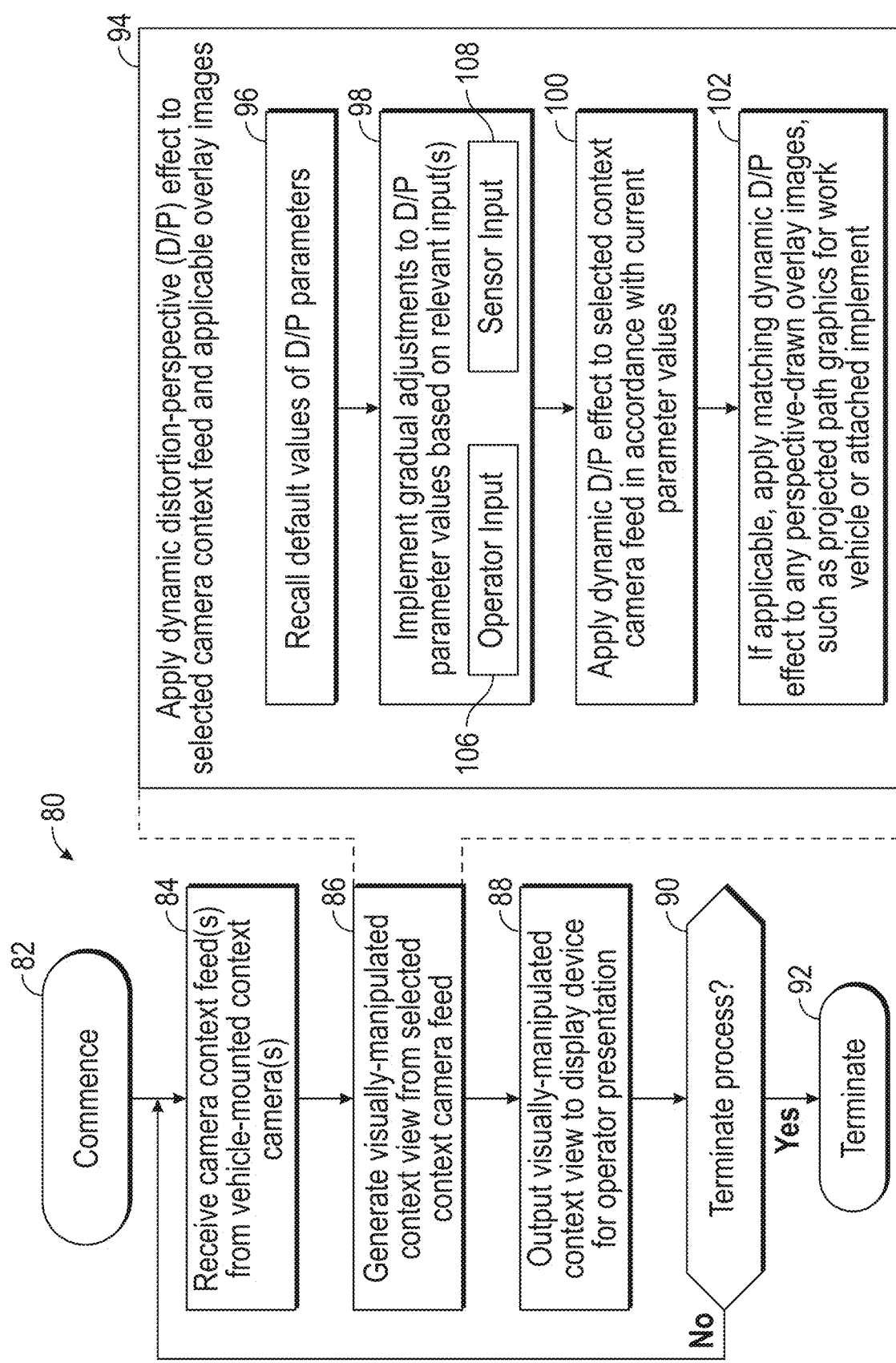
FIG. 3 a flowchart setting-forth an example process suitably carried-out by the controller architecture of the work vehicle display system shown in FIG. 1 to generate a visually-manipulated context view for presentation on a display device onboard or offboard the wheel loader.

Advancing to FIG. 3, a flowchart of a display process 80, which is suitably carried-out by the controller architecture 48 (FIG. 1) to generate a visually-manipulated context view on a display device (e.g., the display device 54 of the wheel loader 20), is depicted in accordance with an example embodiment of the present disclosure. The illustrated display process 80 (hereafter, the "context view manipulation process 80") includes a number of process STEPS 82, 84, 86, 88, 90, 92, each of which is described below. Additionally, a subprocess 94, which includes a number of SUB-STEPS 86, 98, 100, 102, and which may be performed during STEP 86 of the context view manipulation process 80, is further shown on the right of FIG. 3. Depending upon the particular manner in which the context view manipulation process 80 is implemented, each step generically illustrated in FIG. 3 may entail a single process or multiple sub-processes. Further, the steps illustrated in FIG. 3 and described below are provided by way of non-limiting example only. In alternative embodiments of the context view manipulation process 80, additional process steps may be performed, certain steps may be omitted, and/or the illustrated process steps may be performed in alternative sequences.

At STEP 82, the controller architecture 48 commences the context view manipulation process 80 in response to the occurrence of a predetermined trigger event. In certain instances, the controller architecture 48 may commence performance of the context view manipulation process 80 in response to startup of the wheel loader 20 or, perhaps, in response to activation of the work vehicle display system 22 itself. In other instances, the controller architecture 48 may commence performance of the process 80 when detecting that the wheel loader 20 has been shifted into reverse, in essence to execute a "backup camera" functionality. In still other instances, the controller architecture 48 may commence context view manipulation process 80 in response to a different trigger event, such the receipt of operator input via the operator interface 52 indicating that the context view manipulation process 80 is desirably executed.

After commencing the context view manipulation process 80 (STEP 82, FIG. 3), the controller architecture 48 receives the live camera imagery or "context camera feed" captured by one or more vehicle-mounted context cameras, such as one or more of the context cameras 56-1, 56-2, 56-3 mounted to the wheel loader 20 (FIG. 2). As noted above, the context camera feeds may be provided over wired or wireless connections and availed to the controller architecture 48 in any manner. Subsequently, at STEP 86 (FIG. 3), the controller architecture 48 generates a visually-manipulated context view from at least one of the context camera feeds. In embodiments in which a work vehicle is equipped with a single context camera, the controller architecture 48 generates the visually-manipulated context view from the camera feed provided by this context camera during STEP 86 of the context view manipulation process 80. When a work vehicle is instead equipped with multiple context cameras, the controller architecture 48 will typically select a single context camera feed during STEP 84 for image processing to yield the desired visually-manipulated context view ultimately presented for operating viewing when piloting the wheel loader 20. As a further possibility, the controller architecture 48 may concurrently generate multiple visually-manipulated context views from different context camera feeds when the visually-manipulated context views are simultaneously presented on different display devices or when the visually-manipulated context views are simultaneously presented on a single display device (e.g., the in-cabin display device 54) in, for example, a side-by-side or picture-in-picture format. In still other instances, the controller architecture 48 to visually combine, compile, or stitch together imagery from multiple context camera feeds to yield the visually-manipulated context view.

As previously indicated, when multiple context camera feeds are received during STEP 84, the controller architecture 48 will typically select a single context camera for image processing (e.g., selective application of the below-described distortion and perspective modification effects) to thereby yield the desired visually-manipulated context view for presentation to an operator of the wheel loader 20 (or other work vehicle). For example, in this case, the controller architecture 48 may simply select the context camera feed presently-selected by an operator of the wheel loader 20 through control commands entered via operator interface 52; e.g., a GUI may be generated on the display screen 66 enabling an operator to navigate or switch between the context camera feeds provided by the context cameras 56-1, 60-2, 60-3, as desired. In other instances, and as noted above, the controller architecture 48 may automatically select a context camera feed for processing based upon a current operating condition of the wheel loader 20, such as whether the wheel loader 20 is presented traveling in a rearward direction (in which case the controller architecture 48 may select the camera feed provided by the rear-facing context camera 56-1 for processing during STEP 86) or whether a nearby obstacle is detected to the right, left, or rear of the work vehicle (in which case the controller architecture 48 may select the context camera feed most clearly showing the detected obstacle for processing during STEP 86).

At STEP 86 of the context view manipulation process 80, the controller architecture 48 generates the visually-manipulated context view from the selected context camera feed. Examples of manners in which the controller architecture. Generally, the controller architecture 48 accomplishes this by applying a dynamic D/P modification effect to imagery within the selected context camera feed, while adjusting certain aspects or parameters of the D/P modification effect in response to variations in operator viewing preferences or a monitored operating condition of the wheel loader 20. Such adjustments are applied in an essentially continual or gradual manner such that, considered over a period time, the perspective or distortion characteristics of the visually-manipulated context view gradually change in a visually non-abrupt manner; e.g., the visually-manipulated context view may appear to gradually stretch or compress in horizontal or vertical dimensions, or appear to gradually become more or less distorted, depending upon the dynamic D/P modification effect applied. Additional description of one manner in which the controller architecture 48 may generate the visually-manipulated context view from the selected context camera feed is provided below in connection with the SUBPROCESS 94 shown on the right of FIG. 3.

After generating the visually-manipulated context view (STEP 86), the controller architecture 48 outputs the visually-manipulated context view to a display device for presentation to an operator piloting or, perhaps, overseeing the piloting of the wheel loader 20 (STEP 88). As noted above, the visually-manipulated context view will often be presented on a display device located within the loader cabin 30, such as the in-cabin display device 54 shown in FIG. 1. However, in instances in which the wheel loader 20 is remotely piloted, or in instances in which a remotely-located operator oversees the piloting of the wheel loader 20 (including when the wheel loader 20 is piloted with varying degrees of autonomy), the visually-manipulated context view may be generated on a display device located remotely from the wheel loader 20 (again, generally represented by the box 60 in FIG. 1) and transmitted from the work vehicle display system 22 via the wireless datalink 58.

Lastly, the controller architecture 48 of the work vehicle display system 22 progresses to STEP 90 of the context view manipulation process 80 (FIG. 3). During STEP 90, the controller architecture 48 determines whether termination of the context view manipulation process 80 is warranted; e.g., due to operator input requesting termination of the process 80 or due to shutdown of the wheel loader 20. If determining that the context view manipulation process 80 should be terminated, the controller architecture 48 progresses to STEP 92 and terminates the context view manipulation process 80 accordingly. Otherwise, the controller architecture 48 returns to the STEP 84 and the above-described process steps of the context view manipulation process 80 repeat. By performing the context view manipulation process 80 in this manner, the controller architecture 48 repeatedly updates the visually-manipulated context view in accordance with variations in the D/P parameters. Thus, through gradual adjustments in the applicable D/P effects (e.g., gradual changes in simulated focal lengths or barrel distortion effects, as described below), the visually-manipulated context view may adapt to changes in one or more monitored operating conditions of the work vehicle to provide a tailored display increasing operator situational or contextual awareness in a variety of scenarios when piloting the wheel loader 20.

With continued reference to FIG. 3, an example SUBPROCESS 94 suitably carried-out by the controller architecture 48 in generating the visually-manipulated context view from the selected context camera feed is presented on the right side of this drawing figure. During the SUBPROCESS 94, the controller architecture 48 generates the visually-manipulated context view by applying at least one dynamic D/P modification effect to the selected context camera view, as received during STEP 84 of the context view manipulation process 80, while gradually adjusting at least one parameter of the dynamic D/P modification effect in response to certain changes in operator viewing preferences or in response to changes in a current operating condition of the work vehicle. To this end, the controller architecture 48 may initially recall default values for the applicable D/P parameters during SUBSTEP 96 from the memory 64. The default values may specify, for example, a default location and dimensions of a crop window bounding an area-of-interest within the context camera feed in embodiments. Additionally, in embodiments in which a barrel distortion or warping effect is applied, a default center location and intensity of the barrel distortion effect may be recalled from the memory 64.

Next, during SUBSTEP 96, the controller architecture 48 determines when, and to what degree, to implement gradual or incremental adjustments to the D/P parameters based on one or more input variables. As previously noted, and as indicated by labeled box 106 in FIG. 3, such gradual adjustment to the D/P parameters may be performed in response operator input entered into the work vehicle display system 22 utilizing the operator interface 52. In one approach, an operator may interact with certain GUI elements, such as virtual sliders, generated as part of a GUI produced on the display screen 66 of the in-cabin display device 54 to adjust to preference one or more of the D/P parameters utilized in generating the visually-manipulated context view, with an example of such a GUI shown in FIG. 4. Additionally or alternatively, the controller architecture 48 may implement gradual adjustments to the D/P parameters based on sensor input received from one or more of the onboard sensors 50, as indicated by labeled box 108. Again, such sensor input can include data provided the obstacle detection system 70 indicating the location and movement characteristics of nearby obstacles, data describing the location and movement of the wheel loader 20 (e.g., as determined from GPS data received via GPS model included in the additional sensors 72), or any other data monitored by the onboard sensors 72 and usefully considered in dynamically adjusting the D/P effect applied to the context camera feed to yield the visually-manipulated context view. The controller architecture 48 then applies the dynamic D/P effect to the context camera feed utilizing the current values of the D/P parameters (SUBSTEP 100); and, when appropriate, further applies a matching dynamic D/P effect to any perspective-drawn overlay graphics or images (SUBSTEP 102), such projected path graphics visually demarcating a projected path of the wheel loader 20 or an implement attached thereto (in the present example, the projected path of the bucket 26). Following this, the controller architecture 48 advances to STEP 88 and outputs the visually-manipulated context view to at least one display device (e.g., the in-cabin display device 54) for operator presentation, as previously described.

Figure 4:
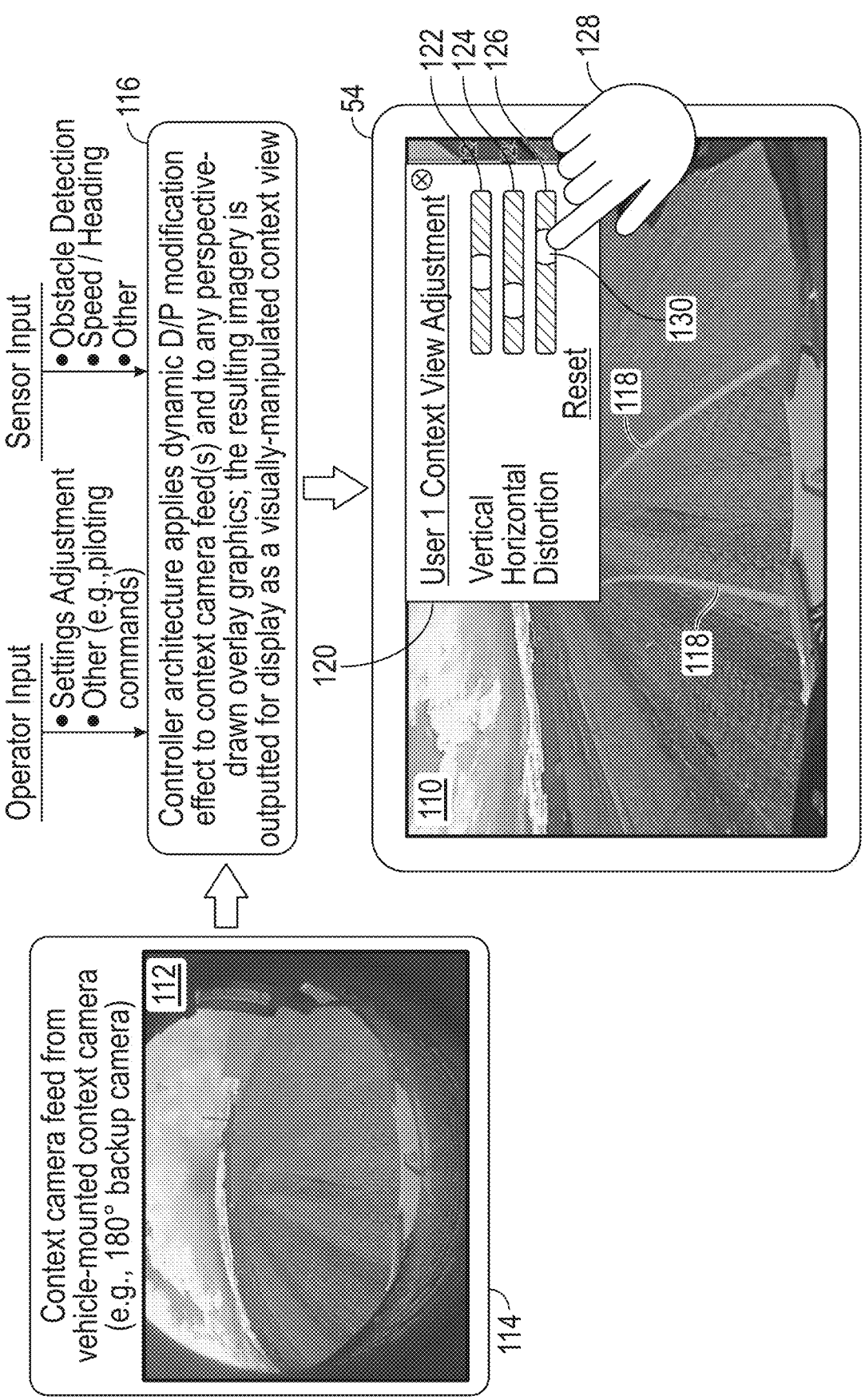
FIG. 4 is a schematic illustrating one manner in which a context camera feed captured by a context camera (here, an ultrawide-angle backup camera) mounted to the wheel loader may be processed by the controller architecture to generate a visually-manipulated context view in embodiments of the work vehicle display system.

Turning now to FIG. 4, an example manner in which the above-described context view manipulation process 80 (FIG. 3) may be performed by the controller architecture 48 to generate a visually-manipulated context view 110 from a context camera feed 112 is schematically presented. In this particular example, and as shown in an upper left panel 114, the context camera feed 112 is received from a 180° backup camera, which may correspond to the rear-facing context camera 56-1 of the wheel loader 20 shown in FIGS. 1 and 2. As can be seen, the captured imagery is highly distorted due to the ultrawide angle lens of the rear-facing context camera 56-1. As discussed above in connection with the context view manipulation process 80, and as briefly summarized in a function block 116 shown in FIG. 4, the controller architecture 48 applies a dynamic D/P modification effect to the context camera feed 112, varying the parameters of the D/P modification effect in response to operator input and/or sensor input as appropriate, and outputs the resulting visually-manipulated context view 110 to the display device 54 for presentation on the screen thereof. In this particular example, the controller architecture 48 applies the D/P modification effect as variable barrel distortion effect, which may partially offset or help correct the distortion of the ultrawide angle lens of the rear-facing context camera 56-1, although it should be noted that this distortion may be only partially corrected to varying extents as discussed below in connection with FIGS. 8-10. Further, varying degrees of simulated vertical and horizontal focal length adjustments may be applied to the source imagery (the context camera feed 112) in applying the D/P modification effect and generating the visually-manipulated context view 110, as further discussed below in connection with FIGS. 5-7. Finally, as shown in the lower right corner of FIG. 4, the controller architecture 48 also applies the dynamic D/P modification effect to any perspective-drawn overlay graphics, such as projected path lines 118 shown in the visually-manipulated context view 110 and visually indicating the projected path of the wheel loader 20 when traveling in a rearward direction.

In embodiments in which the D/P modification effect is operator-adjustable or customizable, various different interfaces, whether virtual and physical in nature, may be provided to enable an operator to vary the adjustable D/P parameters to preference. An example of a GUI window 120 suitably generated on the display screen of the in-cabin display device 54 is shown in FIG. 4 and includes a number of virtual sliders 122, 124, 126 for adjusting different D/P parameters. Specifically, in the illustrated example, a first slider 122 is generated as part of the GUI window 120 enabling the work vehicle operator to adjust the simulated vertical focal length of the visually-manipulated context view over a first range, a second slider 124 is generated enabling the operator to adjust the simulated vertical focal length of the visually-manipulated context view 110 over a second range, and a third slider 126 is generated enabling the operator to adjust the simulated vertical focal length of the visually-manipulated context view 110 over a third range. As indicated by a touch icon 128, in embodiments where the display device 54 has touchscreen capabilities, the operator may interact with the slidable markers 130 to drag or slide the markers 130 in a manner setting the indicated D/P parameters to preference. In other embodiments, an operator may adjust such D/P parameters in another manner; or the D/P parameters may not be operator adjustable and may be varied exclusively by the controller architecture 48 in response to variations in one or more monitored operating conditions of the wheel loader 20.

Finally, as further indicated in FIG. 4, the D/P parameters may also be varied in response to other forms of operator input, which can be utilized to infer desired visual adjustments to the visually-manipulated context view 110. For example, in implementations in which certain work vehicle functions (e.g., FEL assembly or boom assembly movements) are controlled via one or more joysticks or control levers located within the work vehicle cabin, the controller architecture 48 may vary one or more D/P parameters in response to the characteristics (e.g., speed, displacement, and direction) of the joystick movements. As a more specific example, in an alternative implementation in which the display system 22 is integrated into an excavator, the controller architecture 48 may adjust certain aspects of the D/P parameters (e.g., widen the below-described crop window) in response to increasingly pronounced joystick movements rotating the excavator boom assembly, bucket (or another implement), and cabin relative to the tracked undercarriage of the excavator.

In at least some implementations of the work vehicle display system 22, the controller architecture 48 may generate the visually-manipulated context view by initially establishing a crop window bounding an area-of-interest within a context camera feed received during STEP 84 of the context view manipulation process 80. In one approach, the controller architecture 48 may then resize imagery within the area-of-interest to fit the display screen, while excluding imagery outside of the crop window to yield the visually-manipulated context view for presentation on the in-cabin display device 54 (or another display device associated with the wheel loader 20). In this case, the controller architecture 48 may further gradually adjust at least one D/P modification parameter (whether in response to operator input received via the operator interface 52 or in response in changes to a monitored operating condition of the wheel loader 20) by incrementally modifying at least one dimension of the crop window, an aspect ratio of the crop window, or a center location of the crop window within the context camera feed. When such an approach is employed, adjustments to the aspect ratio of the crop window may, in effect, simulate modifications to a horizontal focal length, a vertical focal length, or another perspective parameter of the visually-manipulated context view relative to the context camera feed from which the context view is derived. Further description in this regard will now be provided in connection with FIGS. 5-7.

Figure 5:
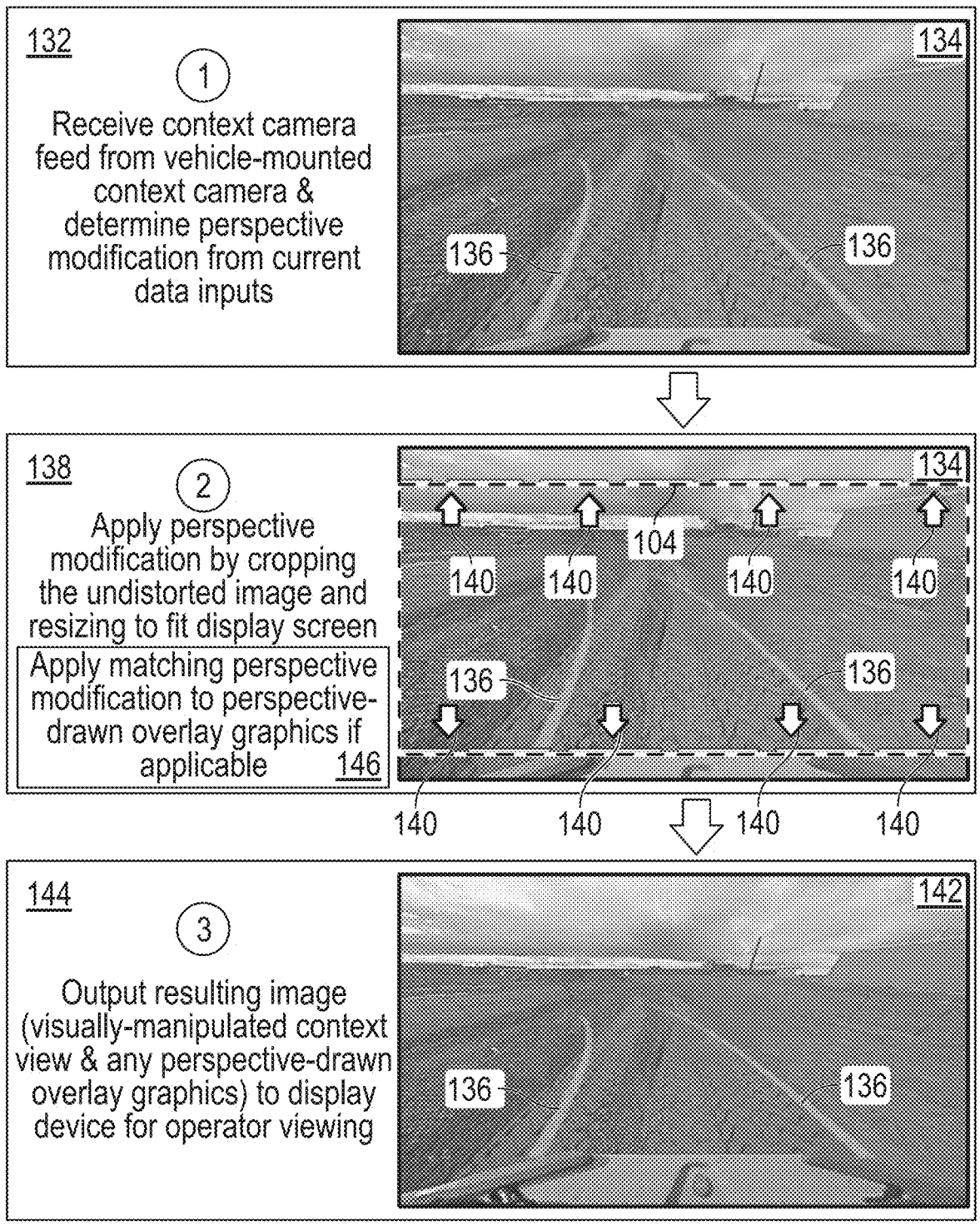
FIGS. 5-7 illustrate example perspective modification effects (here, simulated vertical and horizontal focal length adjustments) suitably applied to the context camera feed and to any perspective-drawn overlay graphics (e.g., projected path graphics) when generating the visually-manipulated context view in embodiments.

An example of one manner in which the controller architecture 48 may utilize the above-mentioned image modification technique to simulate vertical focal length adjustments in generating the visually-manipulated context view during STEP 86 of the context view manipulation process 80 (FIG. 3) is shown in FIG. 5. As indicated in an upper panel 132, the controller architecture 48 receives the selected context camera feed 134. In this particular example, the context camera feed 134 is again depicted as a back-up camera feed, which is shown in an undistorted state for clarity. Additionally, perspective-drawn overlay graphics in the form of projected path graphics or lines 136 are superimposed onto the context camera feed 134 in the upper panel 132 of FIG. 5 for clarity. In conjunction with receiving the selected context camera feed 134, the controller architecture 48 determines the appropriate D/P modifications based upon operator input or a monitored operating condition of the work vehicle at issue; e.g., in the case of the wheel loader 20, the current ground speed of the wheel loader 20, the current trajectory or steering angle of the wheel loader 20, or the proximity of any nearby obstacles detected by the obstacle detection system 70. In this example, the adjustable parameters of the D/P modification effect may define the boundaries and location of a crop window 104, an example of which is shown in a middle panel 138 in FIG. 5. As further indicated by arrows 140, the imagery within the crop window 104 is then resized (here, effectively stretching the area-of-interest in vertical directions) to yield the visually-manipulated context view 142 shown in the lower panel 144, which is then presented on the in-cabin display device 54 (or another display device) for operator viewing. Further, as indicated in FIG. 5 by a box 146, a matching D/P modification (here, a perspective modification) is also applied to the projected path lines 136 in yielding the composite imagery shown in the lower panel 144.

Figure 6:
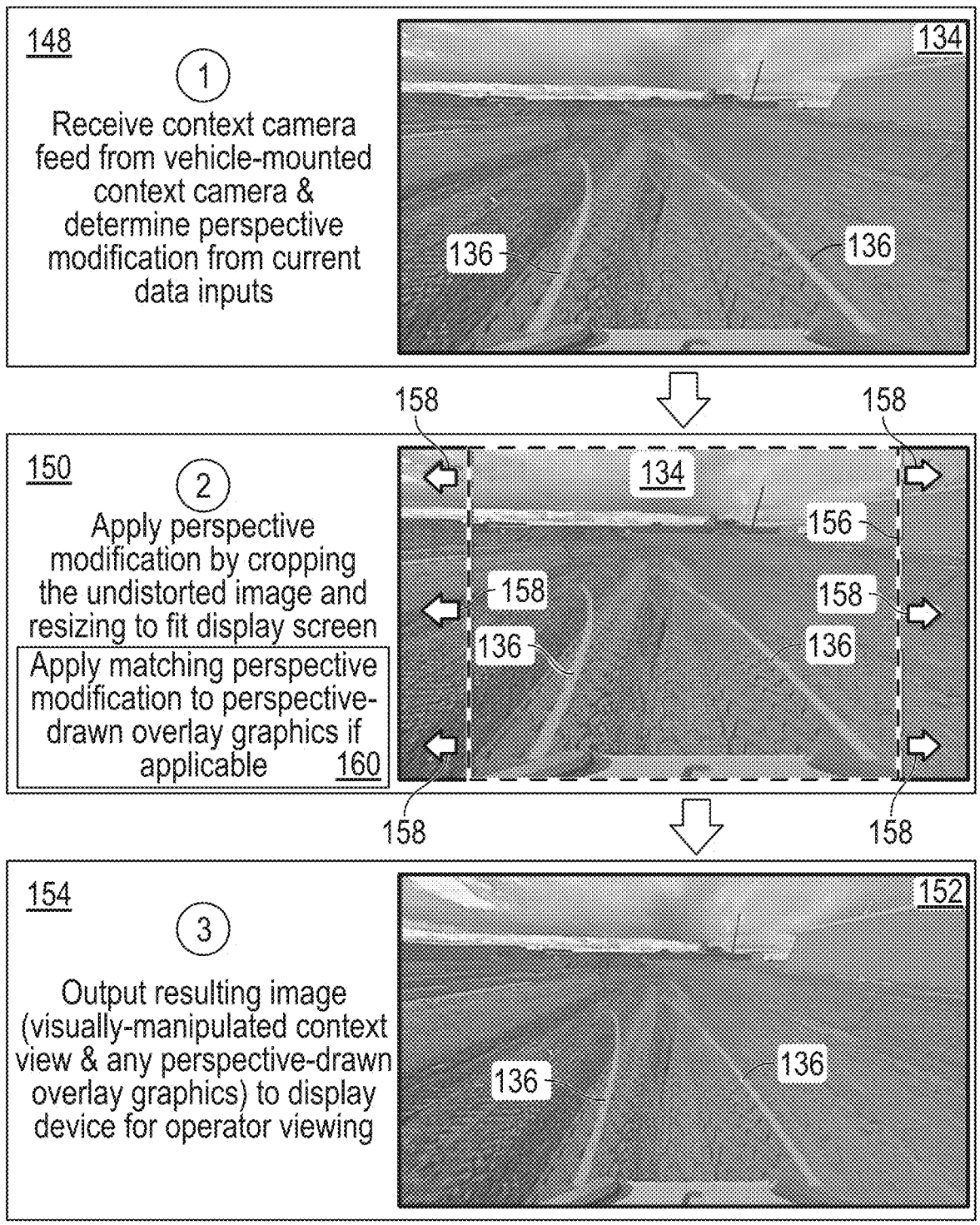

Similarly, as indicated in the example of FIG. 6, and with like numbers carried-over to identify the context camera feed 134 and the projected path lines 136, the controller architecture 48 of the work vehicle display system 22 receives the context camera feed (upper panel 148) and applies the appropriate D/P modification (middle panel 150) to generate a visually-manipulated context view 152 (lower panel 154). However, in this particular example, the D/P modification effect applied by the controller architecture 48 entails a simulated horizontal focal length adjustment. Accordingly, a crop window 156 is established having a width, which may be varied by the controller architecture 48 over an essentially continuous range in accordance with operator input and/or one or more monitored work vehicle operating condition. As indicated by a number of arrows 158 in the middle panel 160, the crop window 156 is then resized (here, vertically stretched) by the controller architecture 48 in arriving at the visually-manipulated context view 152 shown in the lower panel 154. Again, as indicated in FIG. 6 in labeled box 160, a commensurate D/P modification effect is also applied to the projected path lines 136, which are generated in conjunction with the visually-manipulated context view 152 as a composite image as shown.

Figure 7:
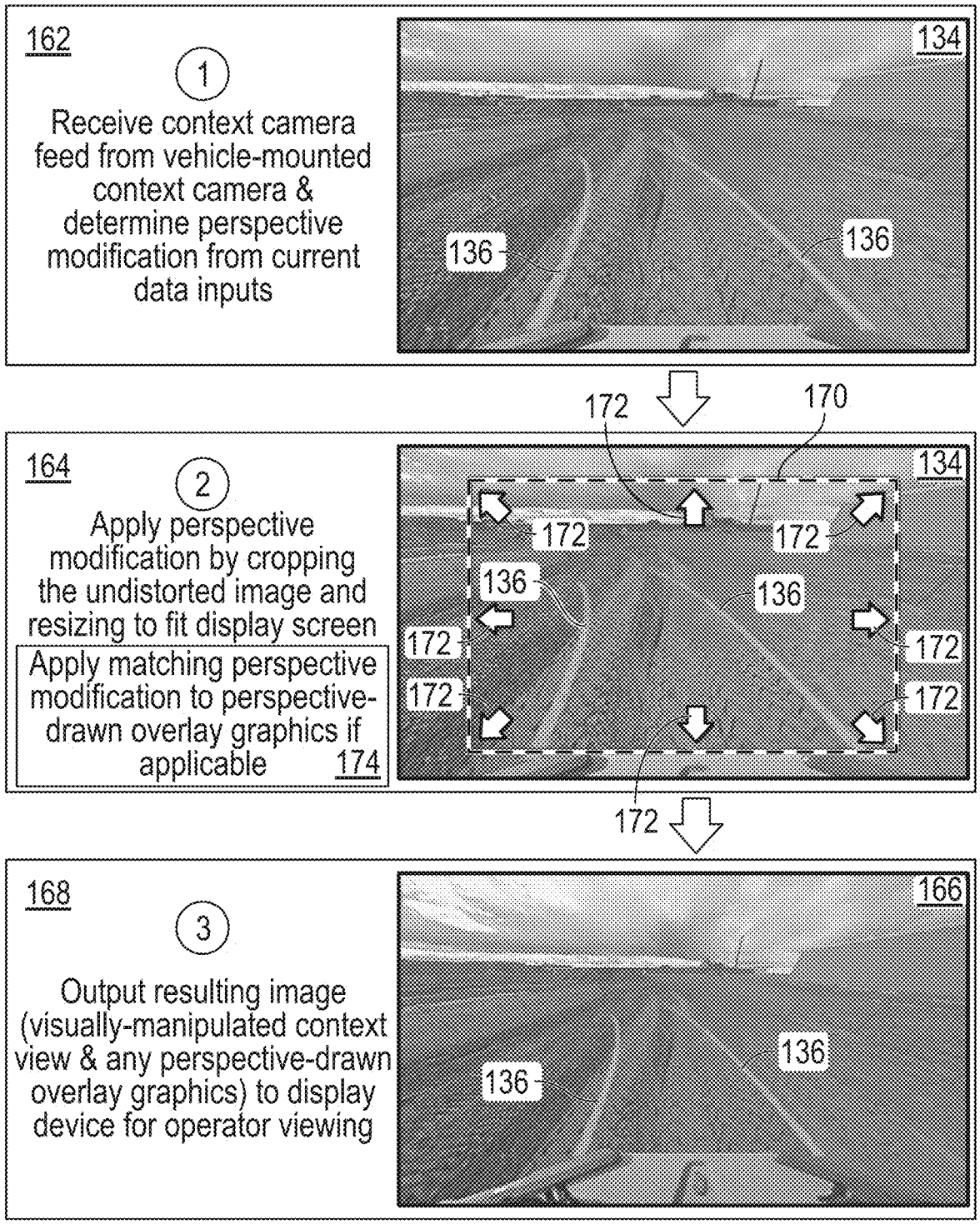

Finally, an example in which the controller architecture 48 applies both simulated vertical and horizontal focal length adjustments in applying a dynamic D/P effect to a pertinent context camera view and generating the visually-manipulated context view is presented in FIG. 7. Once again, the controller architecture 48 receives the context camera feed (upper panel 162) from a vehicle-mounted context camera (e.g., the back-up camera 56-1 mounted to the wheel loader 20 shown in FIGS. 1-2) and applies the appropriate D/P modification (middle panel 164) to generate a visually-manipulated context view, such as the visually-manipulated context view 166 shown in the lower panel 168 of FIG. 7. In this particular example, both the height and width of a crop window 170 are adjusted dynamically in response to changes in user input and/or one or more monitored operating conditions of the work vehicle, with the crop window 170 then resized or stretched as appropriate to fit the display screen 66 of the display device 54, as indicated by arrows 172. The controller architecture 48 may vary the height and width of the crop window 156 to preserve the aspect ratio of the window 156 in embodiments, while this may not be the case in other embodiments. Additionally, and as indicated by a labeled box 174, a matching D/P effect is also applied to the projected path lines 136 (or any other perspective-drawn graphics), which are generated in conjunction with or as part of the visually-manipulated context view 152.

The above-described manner, the adjustments to the width and/or length of the crop windows 104, 156, 170 may effectively simulate modifications to a horizontal focal length, a vertical focal length, or another perspective parameter of the visually-manipulated context view relative to the context camera feed. Such aspects the crop windows 104, 156, 170 can be adjusted in response to operator input and/or changes in a monitored operating condition of the work vehicle, as described throughout this document. For example, in embodiments, the controller architecture 48 may widen the crop window as the ground speed of the work vehicle (e.g., the wheel loader 20) increases to impart the operator with an enhanced view of the work vehicle's exterior environment at higher vehicle speeds. Such changes are applied in a gradual manner such that, as the work vehicle ground speed increases, the crop window gradually widens in a visually non-abrupt manner. Further, in such embodiments, the controller architecture may increase height of the crop window at a rate matching the rate of width increase to generally preserve the aspect ratio of the crop window, the controller architecture 48 may increase height of the crop window at a rate different than (e.g., less than) the rate of width increase, or the controller architecture 48 may not alter the height of the crop window, thereby effectively creating a horizontal distortion or stretch effect in conjunction with increasing vehicle ground speed. In embodiments, such gradual changes in the dimension of the crop window may be applied to create the false impression, as perceived by a work vehicle operator viewing the visually-manipulated context view, that distances between the work vehicle and nearby objects are increasingly reduced with increasing work vehicle ground speeds. In this manner, the visually-manipulated context view may be generated such objects may appear increasingly closer to the work vehicle as higher work vehicle higher speeds and increasingly further from the work vehicle at lower work vehicle speeds.

Aspects of the crop windows 104, 156, 170 can be adjusted in relation to other operating conditions of the work vehicle in addition to or in lieu of changes in the work vehicle ground speed. For example, in certain embodiments, the controller architecture 48 may monitor a trajectory of the work vehicle or, perhaps, an implement attached to the work vehicle, such as the bucket 26 mounted to the wheel loader 20. The controller architecture 48 may then adjust one or more aspects of the crop window in response to changes in the monitored trajectory of the wheel loader 20 or the bucket 26. Specifically, in at least some realizations, the controller architecture 48 may be configured to adjust the one or more aspects of the crop window such that visually-manipulated context view captures a greater portion of a spatial region toward which the work vehicle or the work vehicle implement is presently traveling. For example, when the wheel loader 20 is turning in a particular direction, the controller architecture 48 may gradually move the crop window within the context camera feed to generally center the crop window on the spatial region toward which the work vehicle is headed and/or the controller architecture 48 may gradually widen the crop window to provide an enhanced view of this spatial region. In an analogous manner, in embodiments in which the work vehicle is equipped with an obstacle detection system, such as the obstacle detection system 70 of the wheel loader 20, the controller architecture 48 may adjust one or more aspects of the crop window to visually emphasize obstacles detected by the obstacle detection system 70 and posing a potential collision risk to the work vehicle.

Figure 8:
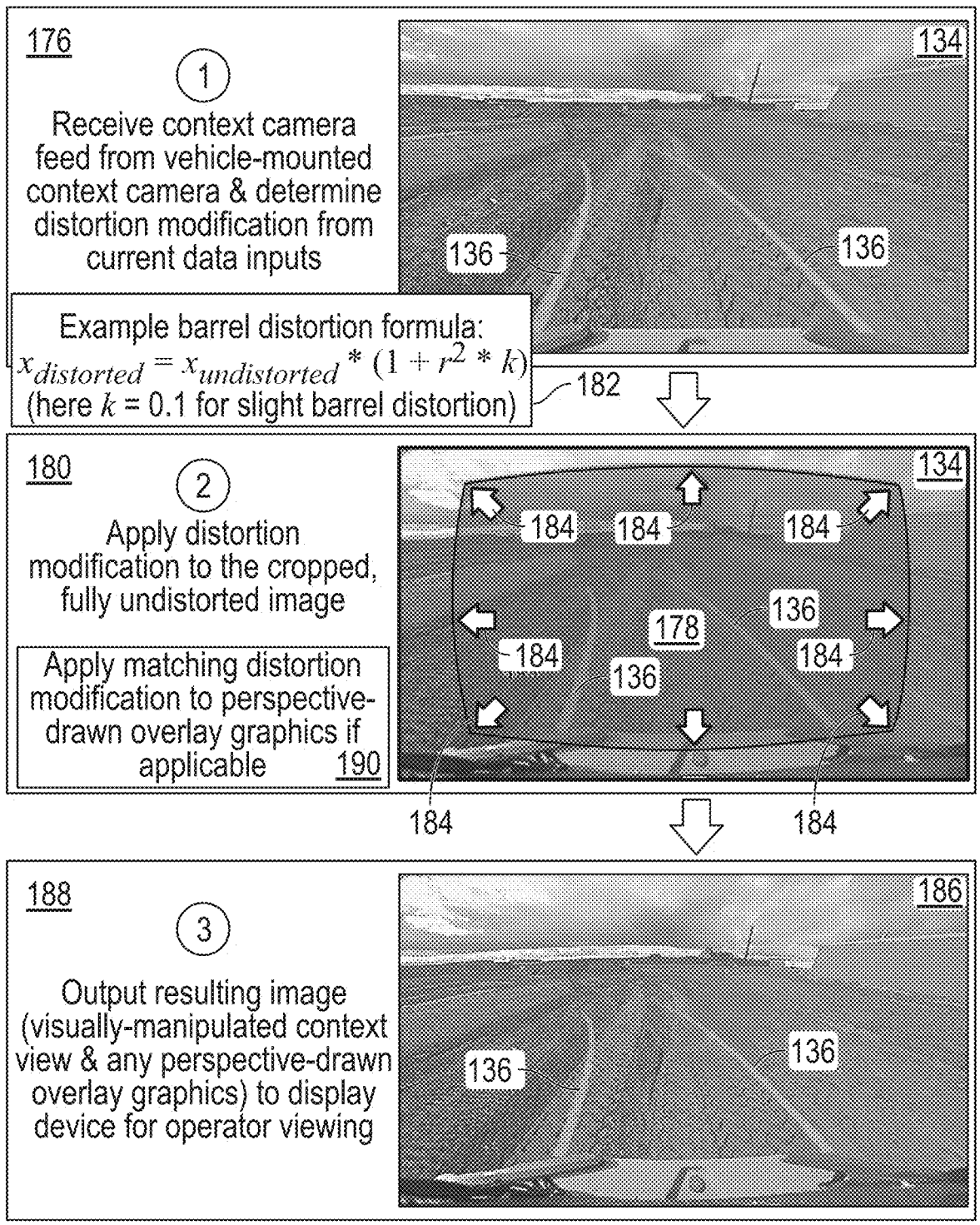
FIGS. 8 and 9 illustrate example distortion modification effects suitably applied to the context camera feed and to any perspective-drawn overlay graphics when generating the visually-manipulated context view in embodiments.
Figure 9:
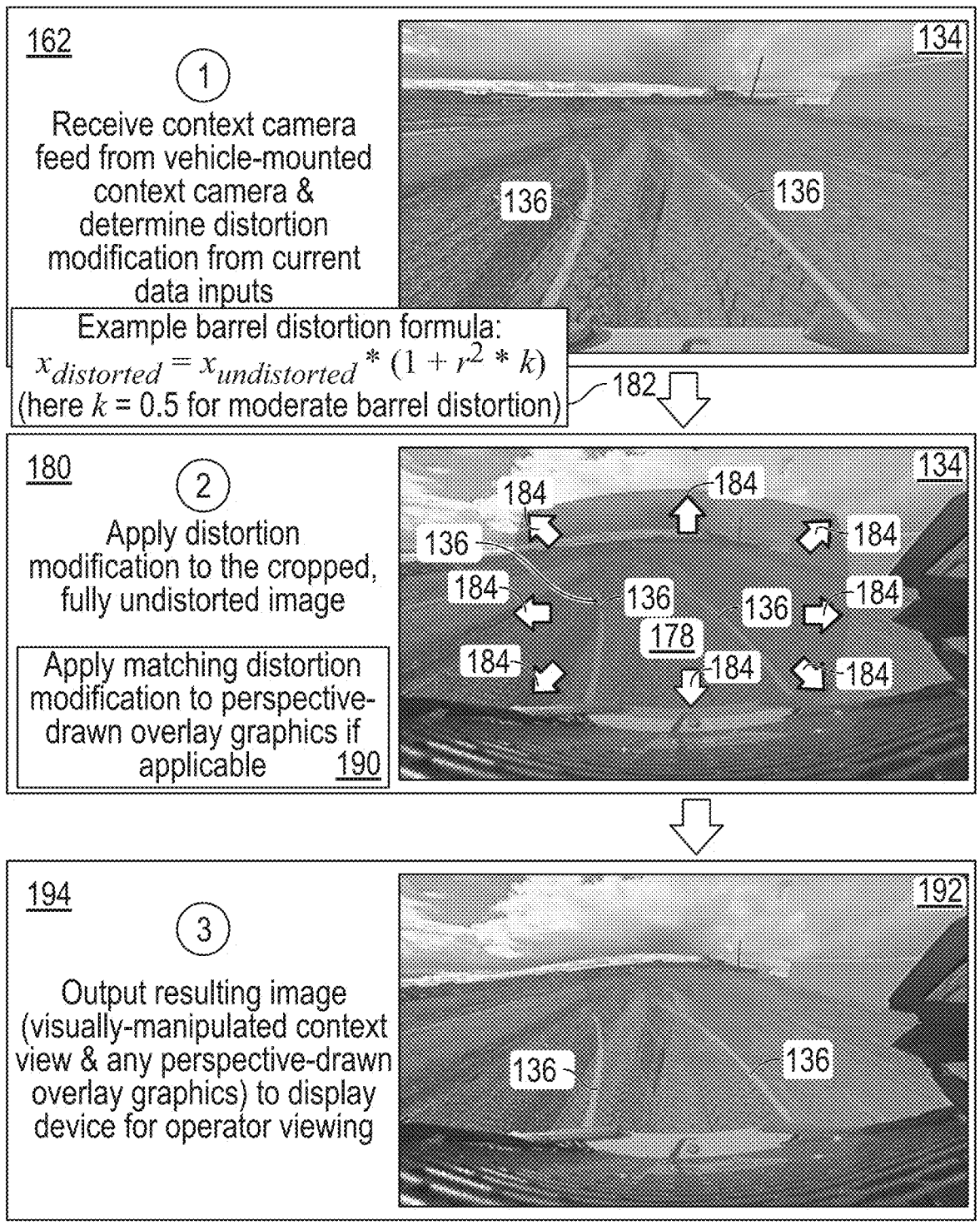
Figure 10:
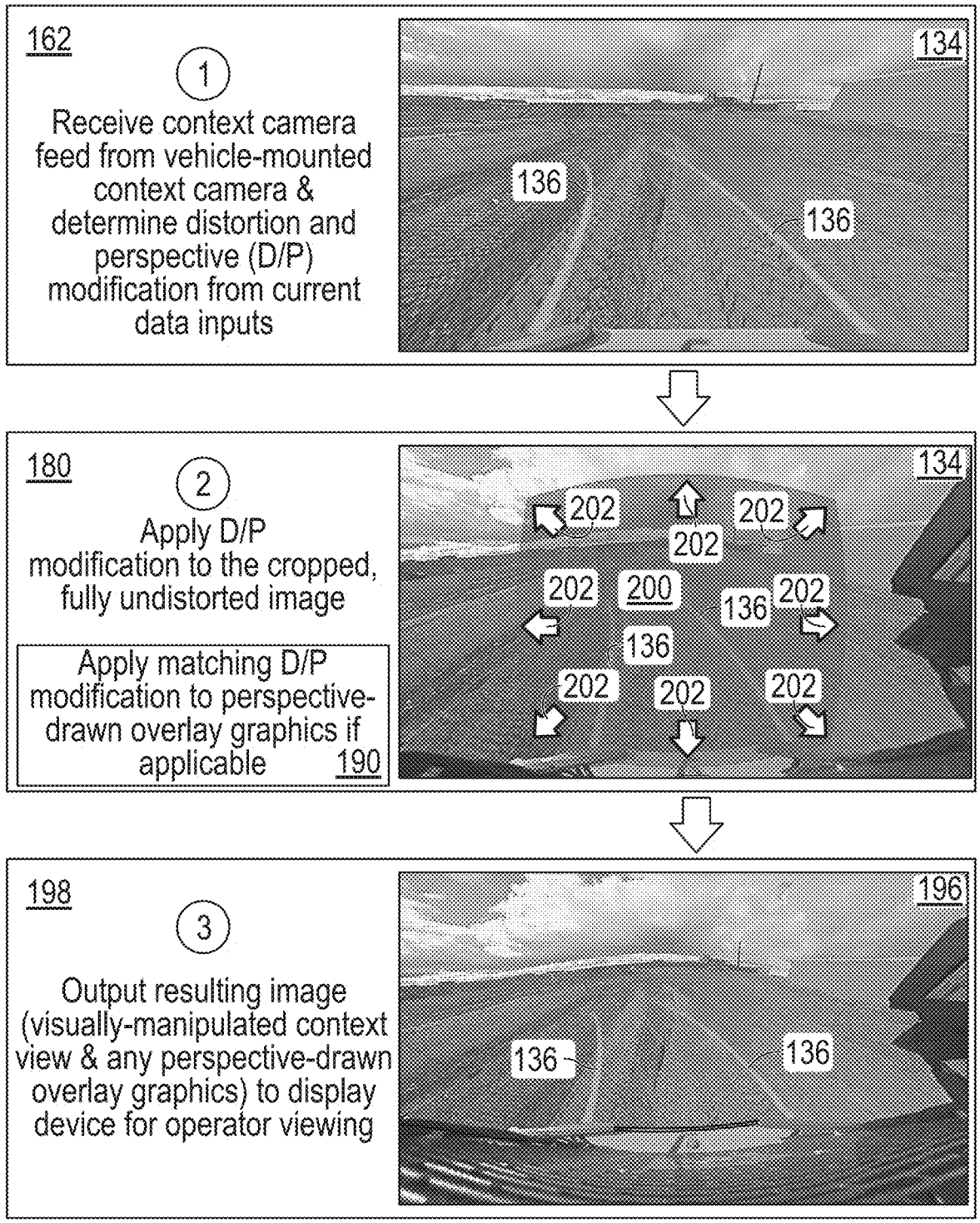
FIG. 10 illustrates example distortion and perspective modification effects suitably be applied to the context camera feed and any perspective-drawn overlay graphics when generating the visually-manipulated context view in embodiments.

Referring now to FIGS. 8-10 in conjunction with FIGS. 1-3, the controller architecture 48 may apply other dynamic D/P effects in generating the visually-manipulated context view in addition to or in lieu of the above-described simulated horizontal and/or vertical focal length adjustments. For example, in at least some implementations, the controller architecture 48 may apply a barrel distortion effect to the context camera feed received at STEP 84 of the context view manipulation process 80 (FIG. 3) in generating the visually-manipulated context view, while varying the center and/or the intensity of the barrel distortion effect in conjunction with operator preferences or monitored operating conditions of the wheel loader 20. An example in which the controller architecture 48 applies a barrel distortion effect having a relatively low intensity (yielding a slightly distorted image) is shown in FIG. 8. Again carrying-over the reference numerals as appropriate, the controller architecture 48 receives the selected context camera feed (upper panel 176) and determines the current severity or intensity of the barrel distortion effect based upon the relevant input factors, which may include operator input specifying operator viewing preferences or sensor input indicative of a current operating condition (e.g., ground speed, heading, or relative positioning to nearby obstacles) of the wheel loader 20. The controller architecture 48 then generates a distortion window 178 (middle panel 180) utilizing a suitable barrel distortion formula or algorithm. Different barrel distortion formulae are known and suitable for usage in embodiments of the work vehicle display system 22. An example of one such formula (also set-forth in a box 182 shown in FIG. 8) is set-forth below:

$$x_{distorted} = x_{undistorted} * (1 + r^2 * k)$$

wherein the variable x is the x (or y) pixel location in the image (with the distorted image corresponding to the visually-manipulated context view), the variable r is the distance from optical center, and the variable k is a coefficient determining the severity or intensity of the distortion (warping) effect. In the example of FIG. 8, only a mild or slight distortion effect is applied such that k=0.1. The distortion effect is also indicated by the arrows 184 indicating the manner in which the distortion window 178 is resized to yield the visually-manipulated context view 186 shown in the lower panel 188. A matching barrel distortion effect is likewise applied to the projected path lines 136, as indicated in a box 190.

In this manner, the controller architecture 48 of the work vehicle display system 22 may applies a barrel distortion effect to the context camera feed received during STEP 84 of the context view manipulation process 80 (FIG. 3) to yield the visually-manipulated context view, while gradually adjusting an intensity level of the barrel distortion effect. The controller architecture 48 may adjust the intensity level of the barrel distortion effect (e.g., by varying the value of the coefficient k in the equation above) over a range of values in relation to operator input data or to a monitored condition of the work vehicle. For example, in the latter regard, the controller architecture 48 may monitor a ground speed of the work vehicle (e.g., the wheel loader 20) in embodiments, and gradually adjust the intensity level of the barrel distortion effect based, at least in part, on variations in the monitored ground speed of the work vehicle. Additionally or alternatively, the controller architecture 48 may adjust the intensity level of the barrel distortion effect based, at least in part, on an estimated risk of a collision between the work vehicle and an obstacle detected by an obstacle detection system in embodiments, such as the obstacle detection system 70 of the wheel loader 20. It is also possible for the controller architecture 48 to vary the center location of the barrel distortion effect in at least some instances to, for example, to generally track movement of a detected obstacle relative to the work vehicle. In other embodiments, the center location of the barrel distortion effect may not vary and may be coincident with the center of the context camera feed from which the visually-manipulated context view is derived.

For completeness an example of a moderate barrel distortion effect is shown in FIG. 9, with reference numerals carried forward from FIG. 8 as appropriate. In this example, a more pronounced barrel distortion effect is applied (k=0.5) yielding a more highly distorted visually-manipulated context view 192 shown in the bottom panel 194. Finally, with reference to FIG. 10, in still further embodiments of the context view manipulation process 80 (FIG. 3), the D/P modification effect applied by the controller architecture 48 may include a combination of such barrel distortion and perspective effects, which are applied to yield the distorted visually-manipulated context view 196 shown in the bottom panel 198; e.g., as indicated a crop/distortion window 200 is established in the above-described manner and then resized (arrows 202) to yield the visually-manipulated context view 196. In the above-described manner, embodiments of the work vehicle display system 22 provide a higher level of customizability to better suit operator preferences and varying operational scenarios, while further operator enhancing situational awareness to improve safety and work vehicle efficiency in an intuitive, visually seamless manner.

ENUMERATED EXAMPLES OF THE WORK VEHICLE DISPLAY SYSTEM

The following examples of the work vehicle display system are further provided and numbered for ease of reference.

1. Embodiments of a work vehicle display system, which is utilized in piloting a work vehicle, include a display device having a display screen, a context camera mounted to the work vehicle and positioned to capture a context camera feed of the work vehicle's exterior environment, and a controller architecture coupled to the display device and to the context camera. The controller architecture configured to: (i) receive the context camera feed from the context camera; (ii) generate a visually-manipulated context view utilizing the context camera feed; and (iii) output the visually-manipulated context view to the display device for presentation on the display screen. In the process of generating the visually-manipulated context view, the controller architecture applies a dynamic distortion-perspective (D/P) modification effect to the context camera feed, while gradually adjusting a parameter of the dynamic D/P modification effect in response to changes in operator viewing preferences or in response to changes in a current operating condition of the work vehicle.

2. The work vehicle display system of example 1, wherein the controller architecture is further configured to further apply the dynamic D/P modification effect to perspective-drawn overlay images presented on the display screen concurrently with the visually-manipulated context view as a composite image.

3. The work vehicle display system of example 2, wherein the perspective-drawn overlay images include a projected path graphic representing a projected path of the work vehicle or a project path of an implement attached to the work vehicle.

4. The work vehicle display system of example 1, wherein, in generating the visually-manipulated context view, the controller architecture is configured to: (i) establish a crop window bounding an area-of-interest within the context camera feed; and (ii) resize imagery within the area-of-interest to fit the display screen, while excluding imagery outside of the crop window to yield the visually-manipulated context view.

5. The work vehicle display system of example 4, wherein the controller architecture is configured to gradually adjust the parameter of the dynamic D/P modification effect by gradually varying a dimension of the crop window in response to changes in the current operating condition of the work vehicle.

6. The work vehicle display system of example 5, wherein the controller architecture is configured to: (i) monitor a ground speed of the work vehicle; and (ii) increase at least a width of the crop window in as the ground speed of the work vehicle increases.

7. The work vehicle display system of example 4, wherein the controller architecture is configured to: (i) monitor a trajectory of the work vehicle; and (ii) adjust one or more aspects of the crop window in response to changes in the monitored trajectory of the work vehicle. The one or more aspects of the crop window include a dimension of the crop window, an aspect ratio of the crop window, or a location of the crop window within the context camera feed.

8. The work vehicle display system of example 7, wherein the controller architecture is configured to adjust the one or more aspects of the crop window such that, as the work vehicle increasingly turns toward a spatial region within the work vehicle's exterior environment, the visually-manipulated context view incrementally captures a greater portion of the spatial region.

9. The work vehicle display system of example 4, wherein the work vehicle includes an obstacle detection system coupled to the controller architecture. Additionally, the controller architecture is configured to: (i) determine when an obstacle detected by the obstacle detection system when posing a collision risk to the work vehicle; and (ii) when so determining, adjust one or more aspects of the crop window to visually emphasize the obstacle within the visually-manipulated context view.

10. The work vehicle display system of claim 1, wherein, in generating the visually-manipulated context view, the controller architecture applies a barrel distortion effect to the context camera feed, while gradually adjusting an intensity level of the barrel distortion effect.

11. The work vehicle display system of example 10, wherein the controller architecture is configured to: (i) monitor a ground speed of the work vehicle; and (ii) gradually adjust the intensity level of the barrel distortion effect based, at least in part, on variations in the monitored ground speed of the work vehicle.

12. The work vehicle display system of example 10, wherein the work vehicle includes an obstacle detection system coupled to the controller architecture. The controller architecture is configured to adjust the intensity level of the barrel distortion effect based, at least in part, on an estimated risk of a collision between the work vehicle and an obstacle detected by the obstacle detection system.

13. The work vehicle display system of example 12, wherein the controller architecture is further configured to adjust a center location of the barrel distortion effect to generally track movement of the obstacle relative to the work vehicle.

14. The work vehicle display system of example 1, wherein the work vehicle includes an obstacle detection system coupled to the controller architecture. The controller architecture is configured to: (i) monitor for cross-traffic collision risks utilizing the obstacle detection system; and (ii) when detecting a cross-traffic collision risk, adjust the parameter of the dynamic D/P modification effect to reveal a greater portion of a spatial region in which the cross-traffic collision risk is located.

15. A method, carried-out by a controller architecture of a work vehicle display system, includes the steps or processes of: (i) receiving, at a controller architecture included in the work vehicle display system, a context camera feed from the context camera; (ii) generating, at the controller architecture, a visually-manipulated context view utilizing the context camera feed; and (iii) outputting the visually-manipulated context view to a display device for presentation on a display screen of the display device. The step of generating includes, in turn, the sub-steps or subprocesses of: (ii)(a) applying a dynamic D/P modification effect to the context camera feed; and (ii)(b) while applying the dynamic D/P modification effect to the context camera feed, gradually adjusting a parameter of the dynamic D/P modification effect in response to changes in operator viewing preferences or in response to changes in a current operating condition of the work vehicle.

CONCLUSION

The foregoing has thus disclosed embodiments of a work vehicle display system, which generates visually-manipulated context views through the application of dynamic D/P modification effects to imagery captured by one or more vehicle-mounted context cameras. Such dynamic D/P modification effects can include any combination of simulated focal length effects and barrel distortion effects, which are applied in a gradual or visually-seamless manner in response to changes in operator viewing preferences or a monitored operating condition of the work vehicle. Through the intelligent application of such effects, embodiments of the work vehicle display system may provide a high level of customizability for operators to tailor such distortion and perspective modifications to best suit a particular work task. Additionally or alternatively, embodiments of the work vehicle display system may apply such dynamic D/P modification effects to selectively distort or otherwise visually-manipulate context camera feeds to, for example, gradually increase the FOV breadth of visually-manipulated context view in conjunction with increasing work vehicle ground speed, distort the visually-manipulated context view (relative to the context camera feed) to intuitively direct operator visual attention to nearby obstacles, modify the visually-manipulated context view to afford the operator with an improved view of spatial regions into which the work vehicle is turning, and provide various other dynamically-applied effects increasing operator awareness of the environment surrounding a work vehicle in an intuitive and non-abrupt manner.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The phrase "at least one" referencing a named group or listing should be understood to include any single member of the named group or any combination of members of the named group or listing. For example, "at least one of A or B" (A and B denoting different named elements, steps, structures, devices, or features) should be understood to mean only A (and not B) is present, only B (and not A) is present, or both A and B are present. The phrase "one or more of" should be interpreted in the same manner. Lastly, the usage of indefinite articles, such as "a" or "an," encompass one or more than one instance of a named element, step, structure, device, or feature. Accordingly, description of a particular apparatus, method, structure, or the like as including "a" named feature, step, device, or the like does not preclude the possibility that the particular apparatus, method, or structure may include multiple instances of the named feature, step, or device.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle display system utilized in piloting a work vehicle, the work vehicle display system comprising:
    a display device having a display screen;
    a context camera mounted to the work vehicle and positioned to capture a context camera feed of the work vehicle's exterior environment; and
    a controller architecture coupled to the display device and to the context camera, the controller architecture configured to:
        receive the context camera feed from the context camera;
        generate a visually-manipulated context view utilizing the context camera feed; and
        output the visually-manipulated context view to the display device for presentation on the display screen;
        wherein, in generating the visually-manipulated context view, the controller architecture applies a dynamic distortion-perspective (D/P) modification effect to the context camera feed, including processing a distortion formula or algorithm to apply to the context camera feed, while gradually adjusting a parameter of the dynamic D/P modification effect, including gradually adjusting a center or an intensity of the distortion applied to the context camera feed, in response to changes in operator viewing preferences or in response to changes in a current operating condition of the work vehicle.

2. The work vehicle display system of claim 1, wherein the controller architecture is further configured to further apply the dynamic D/P modification effect to perspective-drawn overlay images presented on the display screen concurrently with the visually-manipulated context view as a composite image.

3. The work vehicle display system of claim 2, wherein the perspective-drawn overlay images comprise projected path graphics representing a projected path of the work vehicle or a project path of an implement attached to the work vehicle.

4. The work vehicle display system of claim 1, wherein, in generating the visually-manipulated context view, the controller architecture is configured to:
 establish a crop window bounding an area-of-interest within the context camera feed; and
 resize imagery within the area-of-interest to fit the display screen, while excluding imagery outside of the crop window to yield the visually-manipulated context view.

5. The work vehicle display system of claim 4, wherein the controller architecture is configured to gradually adjust the parameter of the dynamic D/P modification effect by gradually varying a dimension of the crop window in response to changes in the current operating condition of the work vehicle.

6. The work vehicle display system of claim 5, wherein the controller architecture is configured to:
 monitor a ground speed of the work vehicle; and
 increase at least a width of the crop window in as the ground speed of the work vehicle increases.

7. The work vehicle display system of claim 4, wherein the controller architecture is configured to:
 monitor a trajectory of the work vehicle; and
 adjust one or more aspects of the crop window in response to changes in the monitored trajectory of the work vehicle;
 wherein the one or more aspects of the crop window comprise a dimension of the crop window, an aspect ratio of the crop window, or a location of the crop window within the context camera feed.

8. The work vehicle display system of claim 7, wherein the controller architecture is configured to adjust the one or more aspects of the crop window such that, as the work vehicle increasingly turns toward a spatial region within the work vehicle's exterior environment, the visually-manipulated context view incrementally captures a greater portion of the spatial region.

9. The work vehicle display system of claim 4, wherein the work vehicle comprises an obstacle detection system coupled to the controller architecture; and
 wherein the controller architecture is configured to:
  determine when an obstacle detected by the obstacle detection system when posing a collision risk to the work vehicle; and
  when so determining, adjust one or more aspects of the crop window to visually emphasize the obstacle within the visually-manipulated context view.

10. The work vehicle display system of claim 1, wherein, in generating the visually-manipulated context view, the controller architecture applies a barrel distortion effect to the context camera feed, while gradually adjusting an intensity level of the barrel distortion effect.

11. The work vehicle display system of claim 10, wherein the controller architecture is configured to:
 monitor a ground speed of the work vehicle; and
 gradually adjust the intensity level of the barrel distortion effect based, at least in part, on variations in the monitored ground speed of the work vehicle.

12. The work vehicle display system of claim 10, wherein the work vehicle comprises an obstacle detection system coupled to the controller architecture; and
 wherein the controller architecture is configured to adjust the intensity level of the barrel distortion effect based, at least in part, on an estimated risk of a collision between the work vehicle and an obstacle detected by the obstacle detection system.

13. The work vehicle display system of claim 12, wherein the controller architecture is further configured to adjust a center location of the barrel distortion effect to generally track movement of the obstacle relative to the work vehicle.

14. The work vehicle display system of claim 1, wherein the work vehicle comprises an obstacle detection system coupled to the controller architecture; and
 wherein the controller architecture is configured to:
  monitor for cross-traffic collision risks utilizing the obstacle detection system; and
  when detecting a cross-traffic collision risk, adjust the parameter of the dynamic D/P modification effect to reveal a greater portion of a spatial region in which the cross-traffic collision risk is located.

15. A method carried-out by a controller architecture operably coupled to a context camera mounted to a work vehicle and a display device having a display screen, the method comprising:
 receiving, at the controller architecture, a context camera feed from the context camera;
 generating, at the controller architecture, a visually-manipulated context view utilizing the context camera feed; and
 outputting the visually-manipulated context view to the display device for presentation on the display screen;
 wherein generating comprises:
  applying a dynamic distortion-perspective (D/P) modification effect to the context camera feed, including processing a distortion formula or algorithm to apply to the context camera feed; and
  while applying the dynamic D/P modification effect to the context camera feed, gradually adjusting a parameter of the dynamic D/P modification effect, including gradually adjusting a center or an intensity of the distortion applied to the context camera feed, in response to changes in operator viewing preferences or in response to changes in a current operating condition of the work vehicle.

16. The method of claim 15, further comprising generating, at the controller architecture, the visually-manipulated context view to include perspective-drawn overlay images, while applying the dynamic D/P modification effect to the perspective-drawn overlay images.

17. The method of claim 16, wherein the perspective-drawn overlay images comprise a projected path graphic representing a projected path of the work vehicle or a project path of an implement attached to the work vehicle.

18. The method of claim 15, wherein generating further comprises:

establishing a crop window bounding an area-of-interest within the context camera feed; and resizing imagery within the area-of-interest to fit the display screen, while excluding imagery outside of the crop window to yield the visually-manipulated context view.

19. The method of claim 18, further comprising gradually adjusting a dimension of the crop window, an aspect ratio of the crop window, or a location of the crop window within the context camera feed in response to changes in the current operating condition of the work vehicle;

wherein the operating condition of the work vehicle comprises one or more of: (i) a ground speed of the work vehicle, (ii) a trajectory of the work vehicle, or (iii) a proximity of the work vehicle to obstacles detected by an obstacle detection system deployed onboard the work vehicle and coupled to the controller architecture.

20. The method of claim 15, wherein generating further comprises applying a barrel distortion effect to yield the visually-manipulated context view, while gradually adjusting an intensity level of the barrel distortion effect or a center location of the barrel distortion effect within the context camera feed.

* * * * *

UNITED STATES PATENT AND TRADEMARK OFFICE
CERTIFICATE OF CORRECTION

| | |
|---|---|
| PATENT NO. | : 11,590,892 B2 |
| APPLICATION NO. | : 17/366899 |
| DATED | : February 28, 2023 |
| INVENTOR(S) | : Bruflodt et al. |

It is certified that error appears in the above-identified patent and that said Letters Patent is hereby corrected as shown below:

In the Claims

In Column 25, Line 37, Claim 6, after 'window' delete "in".

Signed and Sealed this
Second Day of May, 2023

*Katherine Kelly Vidal*

Katherine Kelly Vidal
*Director of the United States Patent and Trademark Office*